United States Patent [19]
Shimomura

[11] Patent Number: 5,867,337
[45] Date of Patent: Feb. 2, 1999

[54] DISK DRIVE OF A SECTOR SERVO SYSTEM FOR POSITIONING AND CONTROLLING A HEAD AT A TARGET POSITION ON A DISK

[75] Inventor: Kazuhito Shimomura, Tokyo, Japan

[73] Assignee: Kabushiki Saisha Toshiba, Kawasaki, Japan

[21] Appl. No.: 616,274

[22] Filed: Mar. 15, 1996

[30] Foreign Application Priority Data

Mar. 17, 1995 [JP] Japan .................................... 7-059495

[51] Int. Cl.$^6$ .................................................. G11B 21/10
[52] U.S. Cl. .......................................... 360/75; 360/77.08
[58] Field of Search .................................... 360/75, 77.02, 360/77.07, 77.08, 78.01, 78.14

[56] References Cited

U.S. PATENT DOCUMENTS

| | | | |
|---|---|---|---|
| 4,414,589 | 11/1983 | Oliver et al. | 360/31 X |
| 5,272,578 | 12/1993 | Diau | 360/75 |
| 5,448,429 | 9/1995 | Cribbs et al. | 360/75 |
| 5,541,784 | 7/1996 | Cribbs et al. | 360/75 |
| 5,570,247 | 10/1996 | Brown et al. | 360/75 |
| 5,612,833 | 3/1997 | Yarmchuk et al. | 360/75 |
| 5,615,058 | 3/1997 | Chainer et al. | 360/75 X |

FOREIGN PATENT DOCUMENTS 4-248172  9/1992  Japan .

OTHER PUBLICATIONS

Shimomura, "Magnetic Disk Device", Patent Abstracts of Japan, publication No. 07–78434, Mar. 20, 1995.

*Primary Examiner*—W. R. Young
*Assistant Examiner*—James L. Habermehl
*Attorney, Agent, or Firm*—Oblon, Spivak, McClelland, Maier & Neustadt, P.C.

[57] ABSTRACT

In a self-servo writing mode, parameters such as a moving amount of a head, a time delay and the like are measured and detected by using preservo information recorded beforehand on, for instance, an outermost periphery of a disk. In accordance with the detected parameters, the head is positioned in a predetermined radial position on the disk and virtual servo information and servo information are written. Then, in accordance with at least either the virtual servo information or the servo information, the head is positioned in a next predetermined radial position and the virtual servo information and the servo information are written. After writing on a full surface of the disk is completed, a normal mode is switched ON and writing/reading of data via the head can be performed.

25 Claims, 17 Drawing Sheets

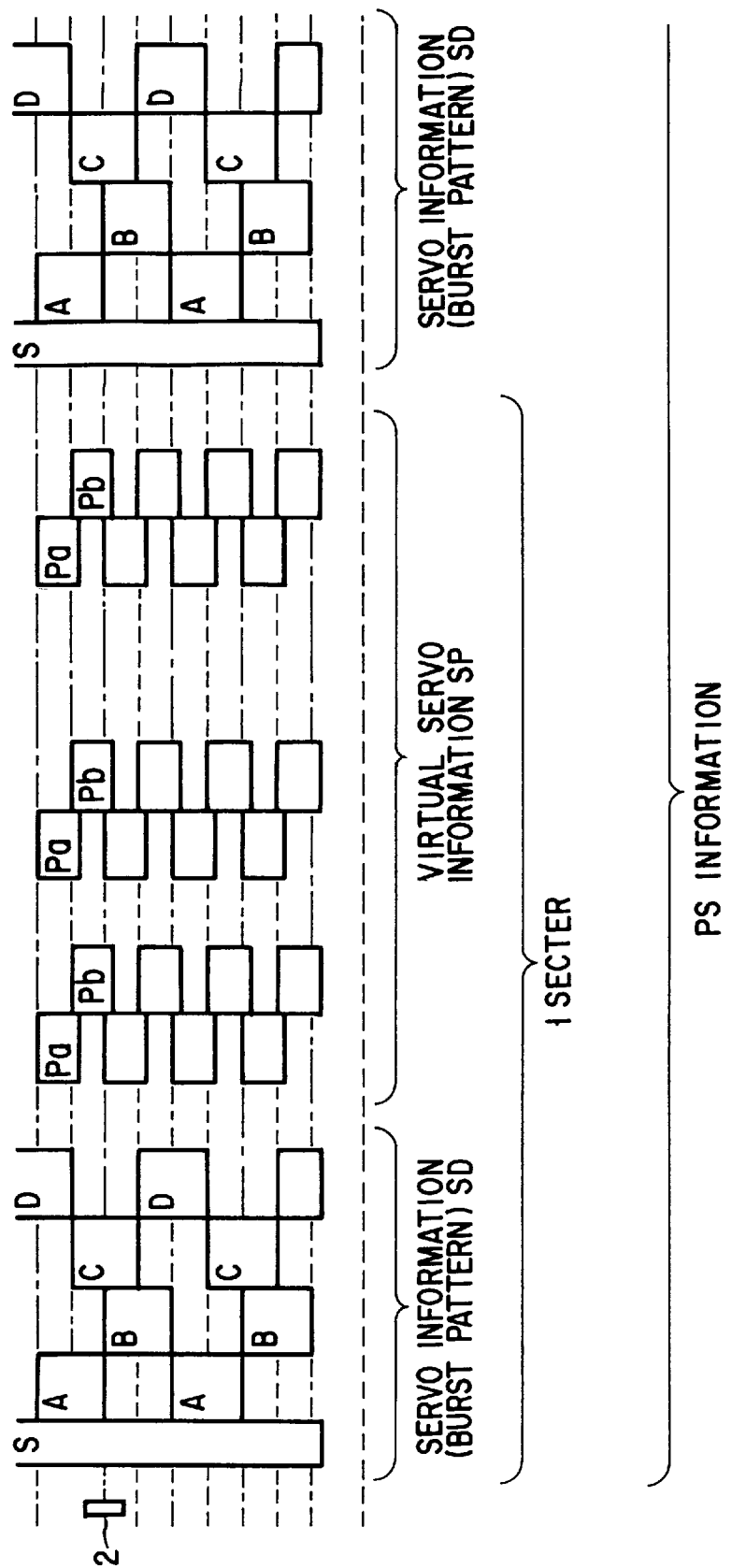
F I G. 13

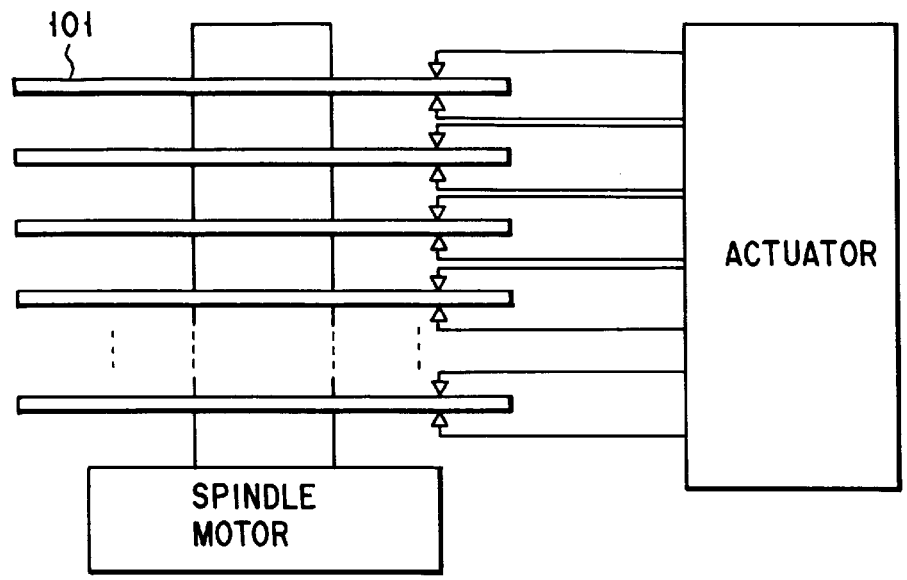
F I G. 17
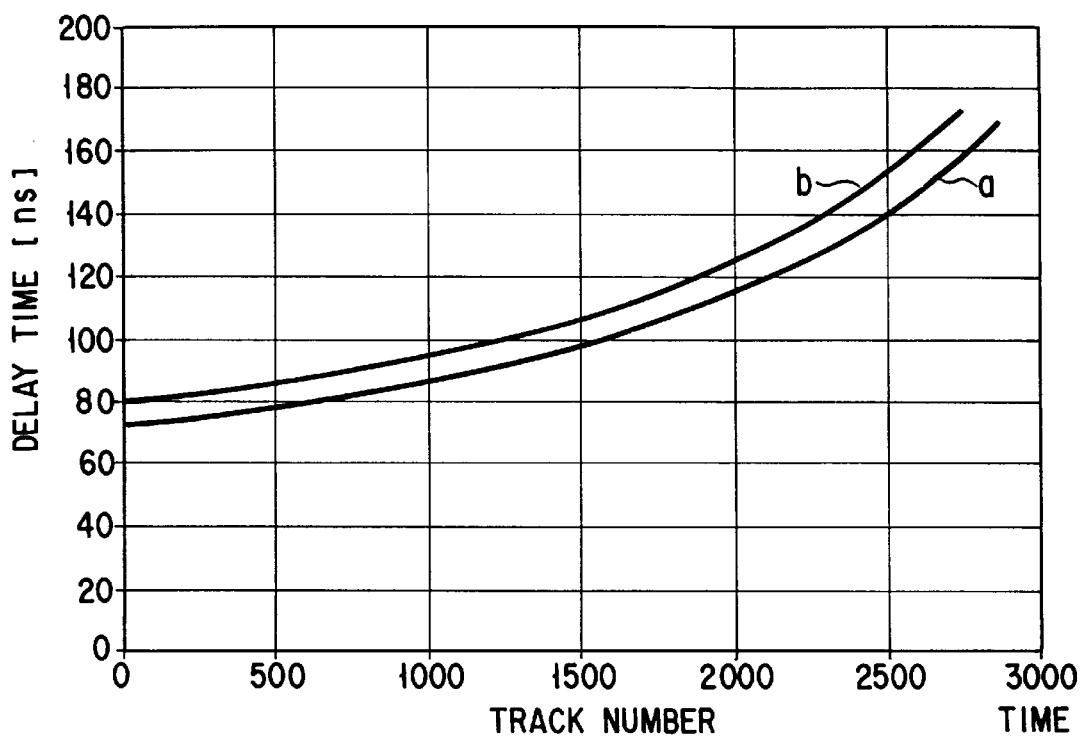
F I G. 18

DISK DRIVE OF A SECTOR SERVO SYSTEM FOR POSITIONING AND CONTROLLING A HEAD AT A TARGET POSITION ON A DISK

BACKGROUND OF THE INVENTION

1. Field of the Invention

The present invention relates to a disk drive of a sector servo system for positioning and controlling a head at a target position on a disk, in accordance with servo information recorded in the disk, and, in particular, to a disk drive having a self-servo writing function of efficiently recording high density and high quality servo information in the disk.

2. Description of the Related Art

Conventionally, in a compact hard disk drive (HDD), servo areas (servo sectors) in which servo information is recorded are arranged at predetermined intervals on a disk. The servo information is read and reproduced by means of a head during data accessing. Based on this reproduced servo information the head is positioned and controlled at a target position (a target track). The servo information is usually written in a predetermined area on the disk by a device used exclusively for writing servo information (hereinafter called a servo writer) during the process of assembling the HDD.

FIG. 1A shows a state where the servo writer is set in the disk drive. The servo writer comprises a clamper (not shown in the drawing) fixing the casing 20 of the HDD, a fixed head 21 for reading/writing a reference signal, a driving plate 22 for positioning the head 2 of the HDD on an arbitrary position of the disk and a driving pin 24 for bringing the driving plate 22 into contact with a carriage arm 23. It further comprises a stepping motor 26 for driving the driving plate 22, a rack and pinion 27 for converting linear displacement generated by the stepping motor 26 into rotational displacement, an encoder 28 for detecting an amount of motion of the driving plate 22, a cable 30 for sending signals to and receiving signals from the disk drive to actuate the spindle motor 13, voice coil motor (VCM) 12 and head amplifier 29 of the HDD, a driving system control circuit, and a servo information recording/reproducing system control circuit (not shown in the drawing).

The HDD is fixed on the clamper (not shown in the drawing) so that the rotational centers of the driving plate 22, the rack and pinion 27 and the encoder 28 can be coincident with that of the carriage arm 23. The fixed head 21 for a reference signal is fixed to the outside of the HDD so as to be positioned at an arbitrary position other than a data area on a disk 1. This fixed head 21 detects a timing for writing servo information in accordance with the reference signal recorded in the disk 1. The reference signal is recorded typically in an area different from a track in which the servo information is written (a track used for normal recording/reproducing) in order to prevent overwriting produced by writing the servo information in the disk 1.

The driving pin 24, which contacts a portion of the carriage arm 23 allows the head 2 on an HDD main body to freely move to an arbitrary position on the disk 1, by rotating the driving plate 22. The driving pin 24 is brought into contact with a portion of the carriage arm 23. This portion of the arm 23 indicates the head placed oppositely to the disk 1, as shown in FIG. 1A, when a top cover 34 of the HDD is opened, or as shown in FIG. 1B when the driving pin 24 is inserted through a notched window 35 provided on a part of the top cover 34.

FIG. 1C is a fragmentary expanded view showing a positional relationship between the carriage arm 23 and the driving pin 24. To determine the position of contact between the driving pin 24 and the carriage arm 23, it is necessary to position the head 2 very accurately at an arbitrary position on the disk 1. For this reason, a contact position, where the amount of a positional shift from the tip of the head 2 is smallest, is on the carriage arm 23 which is more rigid than the head 2 and a suspension 25.

FIG. 1B shows an HDD using a servo writer of a conventional type. In this HDD, the driving pin 24 and the fixed head 21 are inserted respectively through the notched windows 35 and 36. The notched window 35 for the driving pin 24 is formed on the upper part of the top cover 34 and the notched window 36 for the fixed head 21 for a reference signal is formed on the side surface part thereof. In other words, to use the servo writer of a conventional type, it is necessary to form notched windows in predetermined positions on the casing portion of the HDD. These notched windows are kept open even during normal use of the HDD and thus may cause a deterioration in rigidity of the HDD casing or incursion of dust into it.

An explanation will now be given of the processing of servo information writing when the above-described conventional servo writer is used by referring to FIGS. 1A to 2.

First, a power is supplied to the servo writer, and a current is supplied via the cable 30 to the spindle motor 13, the head amplifier 29 and the VCM 12 of the HDD. Driven with the power supplied, the VCM 12 generates a force, moving the head 2 and the carriage 23 in the inner peripheral direction of the disk 1.

The fixed head 21 for reading/writing a reference signal writes only the number according to HDD specifications of reference signals SC generated from a reference signal generation circuit (not shown). Located away from the data area, the fixed head 21 is positioned at a predetermined position on the outer peripheral side of the disk 1. It not only adjusts the number of reference signals SC to be written, but also continues writing until a phase of each reference, signal SC and a phase of writing start/end of the reference signal SC coincide with each other within a predetermined allowable range.

The stepping motor 26 driven in accordance with a supplied power locates the head 2 and the carriage arm 23 on a track provided on the outermost periphery of the data area. In the meantime, as described above, the VCM 12 generates a force, moving the head 2 and the carriage arm 23 in the inner peripheral direction of the disk 1. Thus, by controlling the forces applied in opposing directions, in particular by controlling a force generated by the stepping motor 26, the head 2 can be positioned at a predetermined position on the disk 1. In this case, the encoder 28 monitors the position of the head 2. The head 2 writes signals from the outer periphery to the inner periphery of the disk 1. Alternatively, the head 2 may write signals in the reverse direction. In this case, however, forces must be generated so that the VCM moves the head 2 and the carriage arm 23 in the outer peripheral direction and the stepping motor 26 moves these in the inner peripheral direction. Also, contact positions between the carriage arm 23 and the driving pin 24 are caused to be opposite between the inner and outer peripheral sides of the disk 1.

When the positioning of the head 2 is completed, for instance as shown in FIG. 2, by means of the mechanism and the function described above, the reference signals SC read by the fixed head 21 are counted by an address counter 37, based on index signals (not shown in the drawing). The reference signals SC are then converted into address codes in a pattern memory 38 which stores the servo information beforehand in a host computer (not shown). Proper addresses on the pattern memory 38 are thereby selected. Servo information SD corresponding to the selected addresses is written in the disk 1 and a sector SS is formed. This processing is repeatedly performed for the tracks in which servo information is to be written and then writing of the servo information SD in the disk 1 is completed.

When this method for writing servo information is used, however, one servo writer is occupied just for completing writing of the servo information SD of one HDD. Therefore, a plurality of servo writers are required to simultaneously perform writing of bits of servo information SD of a plurality of HDDs, or one servo writer must write the servo information SD of all HDDs must be written one-by-one, spending a long time. This leads to a big reduction in HDD productivity. Furthermore, a very clean environment is needed in order to avert incursion of dust caused by opening the above-described notched window provided on a part of the HDD or the top cover.

Excitation generated by driving of the stepping motor 26 or the rack and pinion 27 imposes an influence on the positioning of the head 2 via a contact position between the driving pin 24 and the carriage arm 23. A rotational vibration component produced by rotating of the spindle motor 13 also affects positioning of the head 2. As a result, the head 2 may record a vibration component during the writing of the servo writer in the servo information SD. If the positioning of the head is controlled by using the servo information including such a vibration component, the positioning accuracy will naturally decline.

This is because the driving pin 24 for positioning the head 2 contacts only the carriage arm 23 and cannot directly control positioning of the head 2 for writing the servo information SC in the disk 1. This is also because rigidity of the servo writer cannot be increased in an unlimited manner or made completely uniform by eliminating variance, characteristics of HDDs and compatibility with the servo writer, so long as the HDD is fixed with the servo writer. These problems arise as long as the conventional method for writing the servo information in the disk 1 by using the servo writer is employed even when, for instance, high rigidity of a single servo writer or a single HDD casing is realized.

As described above, when the servo information is written by the servo writer, a great deterioration occurs in the quality of the servo information because of a vibration component produced by the servo writer, positioning accuracy of the head positioning control unit of the servo writer, a rotational vibration component produced by the rotation of the HDD spindle motor, a vibration component produced by shaking of the casing of the HDD main body by means of an exciting force of the rotation of the spindle motor, etc.

In recent years, efforts have been made to improve a track density in order to increase the capacity of a compact HDD. However, if a high track density is to realized, there will be greater effects on a track pitch from a vibration by the servo writer itself, the accuracy of the head-positioning control unit, an exciting force produced by an interaction between the head positioning control unit and an HDD main body and the like. These will then cause a decline in a quality of the servo information.

In an effort to solve these problems, consideration has been given to a development of a highly rigid servo writer producing fewer vibrations by providing a highly accurate positioning control mechanism. The manufacturing cost of such a mechanism and a servo writer, however, is very high.

A servo writer must be developed for each kind of HDD machine, even an environment for performing writing of servo information must also be developed and, thus, productivity is low.

SUMMARY OF THE INVENTION

It is an object of the invention to provide a disk drive capable of efficiently recording high density and high quality servo information in a disk.

It is a second object of the invention to provide a disk drive having a self-servo writing function for recording high density and high quality servo information in a disk by means of a head used for reading/writing sector data.

According to a first aspect of the invention, there is provided a disk drive comprising: a disk in which preservo information is written; a head for writing a signal in the disk and reading a signal from the disk; positioning means for positioning the head at a desired position of the disk in accordance with servo information; and writing means for writing virtual servo information in the disk in accordance with the preservo information and for writing the servo information in a predetermined area on the disk based on the virtual servo information.

According to a second aspect of the invention, there is provided a servo writing method of a disk drive having a disk in which preservo information is written, a head for writing a signal in the disk and for reading a signal from the disk and positioning means for positioning the head on a desired position of the disk in accordance with servo information, the method comprising the steps of: writing virtual servo information in the disk in accordance with the preservo information; and writing the servo information in a predetermined area of the disk in accordance with the virtual servo information.

According to a third aspect of the invention, there is provided a disk drive comprising: a disk in which preservo information is written; a head for writing and reading a signal in and from the disk; positioning means for positioning the head at a predetermined position on the disk in accordance with servo information; writing means for writing, in a servo writing mode, virtual servo information on the disk based on the preservo information and the servo information in a predetermined area on the disk based on the virtual servo information and for reading/writing, in a normal mode, data in a predetermined area on the disk by controlling the positioning means; and means for supplying a sampling frequency to the writing means, wherein a sampling frequency supplied in the servo writing mode and a sampling frequency supplied in the normal mode are different from each other.

According to a fourth aspect of the invention, there is provided a disk loaded, as a recording medium, in a disk drive having a head for writing and reading data in and from the recording medium, a motor for rotating the recording medium, writing means for writing servo information and positioning means for positioning the head in a predetermined area on the disk in accordance with servo information, the disk storing: preservo information, to be referred by the writing means, provided with a vibration component smaller than a square sum of a rotation asynchronous vibration component of the spindle motor and a vibration component produced during data writing.

To use a magnetic disk drive according to the above-described aspects which has a self-servo writing function, it is unnecessary to provide a clean and quiet environment during writing of servo information. Also, because writing the servo information is done in each of the disk recording/ reproducing devices itself, a highly rigid and expensive servo writer is not required. As a result, the time needed for writing the servo information is greatly shortened, and it is possible to eliminate all the vibration sources existent in the conventional servo writer. Moreover, since an exciting force produced between the servo writer and the disk recording/ reproducing devices is eliminated, a vibration component contained in the servo information is greatly reduced, consequently making it possible to obtain high quality servo information.

Furthermore, since positioning control is executed during writing of the servo information by referring to the virtual servo information, the head can be positioned by means of wide-band positioning control much greater than a normal servo band. As a result, the head can sufficiently limit the rotational vibration component of the spindle motor and an environmental vibration component during self-servo writing of the disk recording/reproducing devices. Thus, high quality servo information, like that described above, can be obtained.

Furthermore, since no special servo writer is required, no fixed head for reading/writing the reference signal is needed, which is to be inserted from the outside into the drive. And it is unnecessary to bring the positioning driving system of the servo writer into contact with the actuator system of this device. It is not necessary, either, to open the top cover and to provide a notched part on the casing unit. This prevents dust from entering the device, making it unnecessary to provide a special environment during servo information writing.

Furthermore, the disk device need not have a device designed exclusively for writing servo information, thanks to the self-servo writing method. The production cost of the disk drive can be relatively low.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 13 is a conceptual view illustrating a self-servo writing operation in the disk drive of the embodiment;

FIG. 17 is a block diagram illustrating writing of preservo information in a disk loaded on the disk drive of the embodiment; and FIG. 18 is a graph showing a time delay determined by geometrical positions of a head, a spindle motor, an actuator and the like in the disk drive of the embodiment.

DETAILED DESCRIPTION OF THE PREFERRED EMBODIMENTS

Explanation will now be made of a preferred embodiment of the disk drive of the invention, with reference to the accompanying drawings.

Figure 1A:
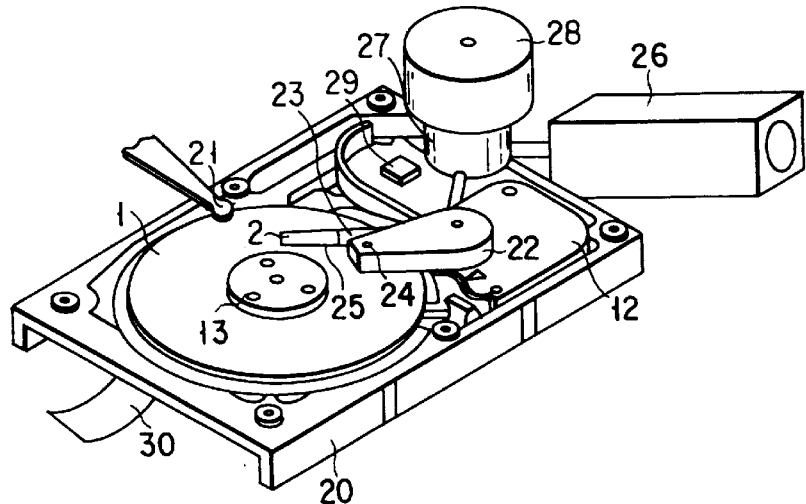
FIGS. 1A to 1C are views showing appearances of a conventional disk drive and a servo writer and a partial structure thereof.
Figure 1B:
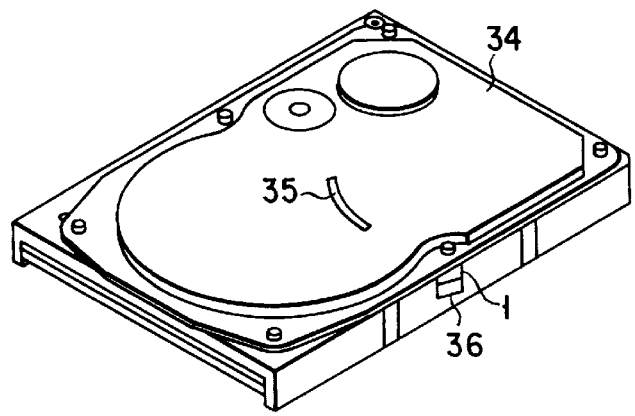
Figure 1C:
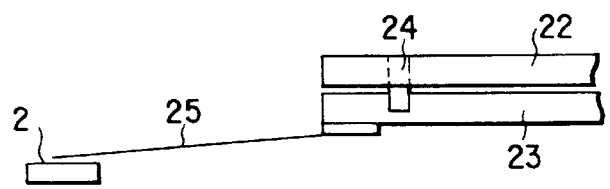
Figure 2:
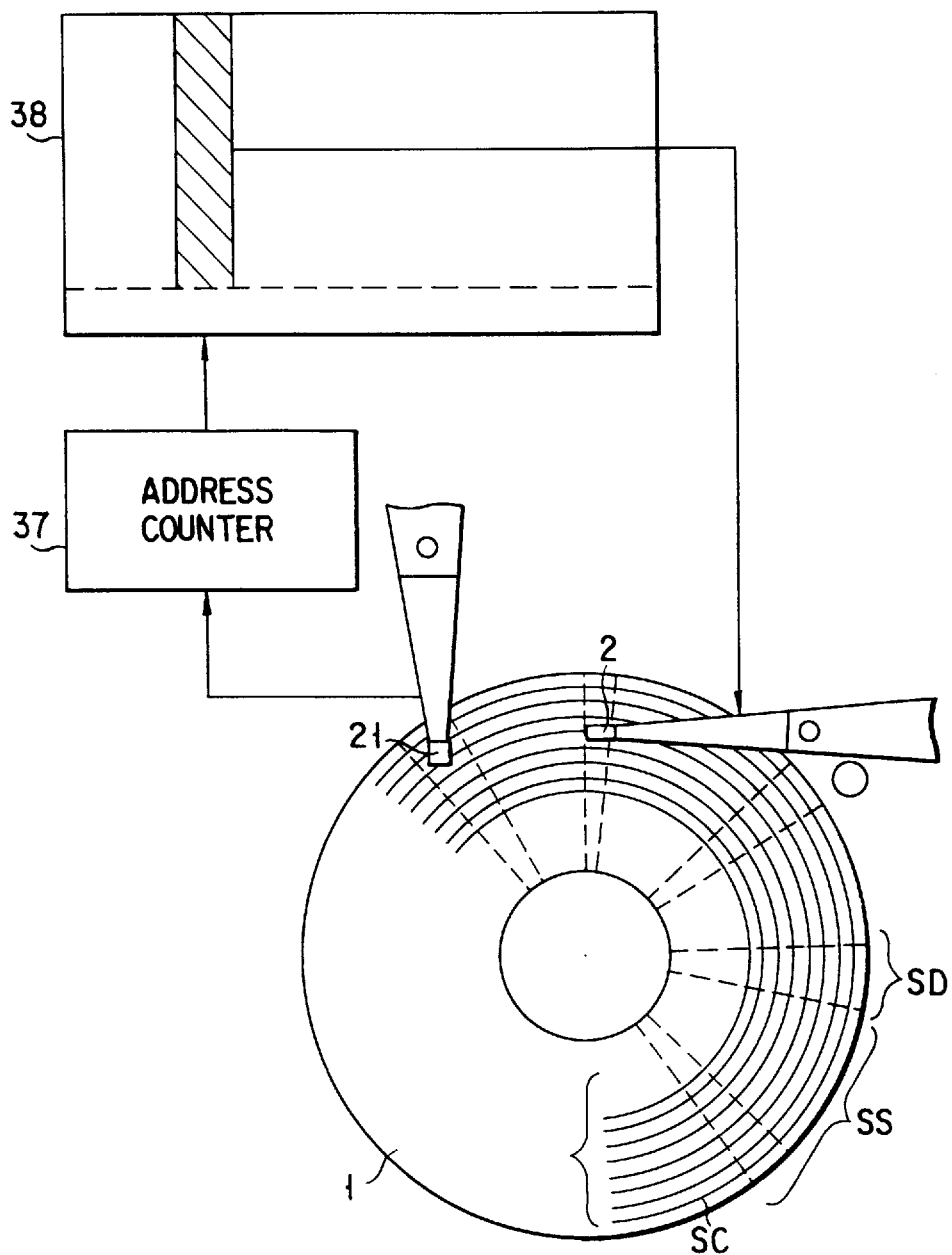
FIG. 2 is a conceptual view illustrating a conventional operation of writing servo information.
Figure 3:
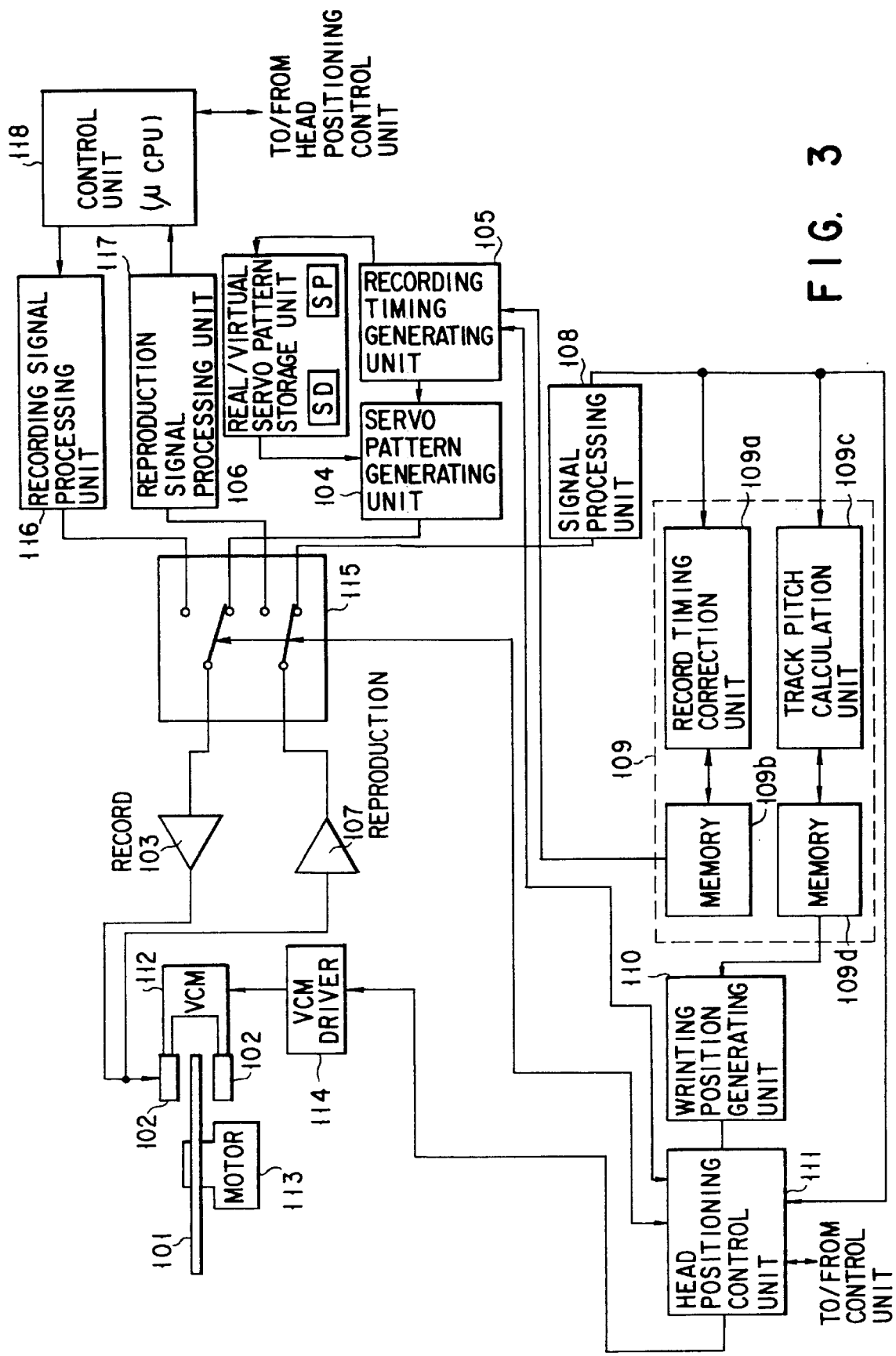
FIG. 3 is a block diagram showing the main parts of a disk drive relating to the preferred embodiment of the invention.
Figure 4A:
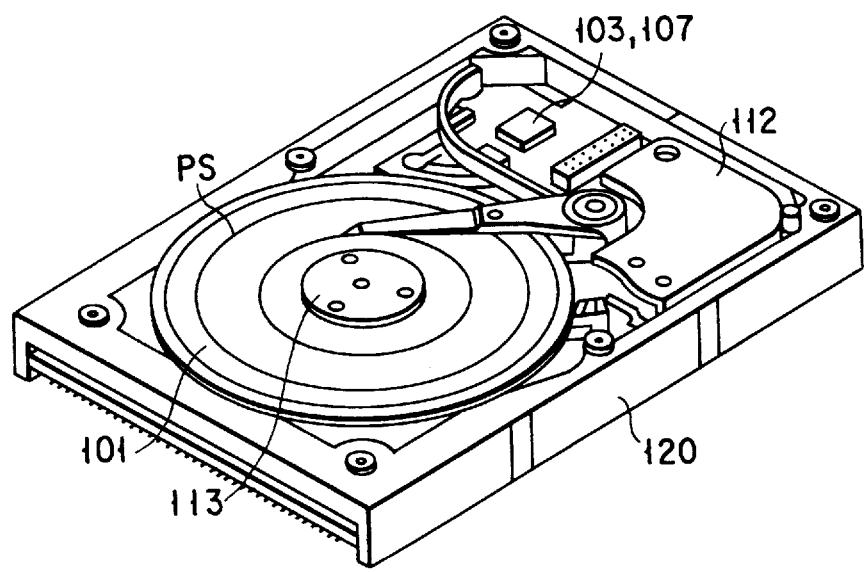
FIGS. 4A and 4B are perspective views showing an appearance of a disk drive having a structure shown in FIG. 3.
Figure 4B:
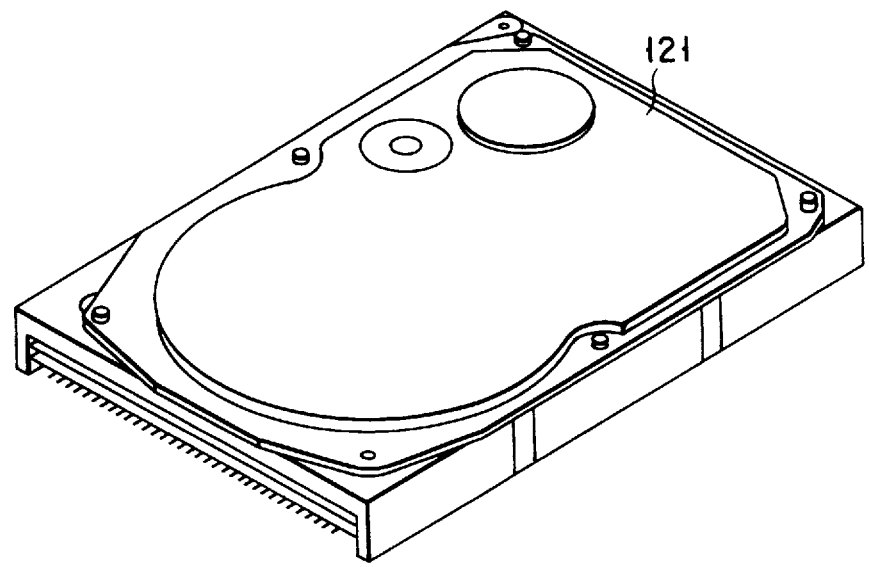

FIG. 3 is a block diagram showing the main parts of the disk drive (HDD) of the embodiment. FIGS. 4A and 4B are perspective views showing an appearance of the HDD. The HDD is a sector servo type, in particular one having a self-servo writing function. In FIG. 3, components necessary for a normal data recording/reproducing function are shown in a simplified manner.

As seen from in FIG. 4A, this HDD is almost identical to an HDD of an ordinary type. The HDD has a disk 101 as a recording medium, a spindle motor 113, a VCM 112 constituting a head positioning control mechanism and a head amplifier (recording and reproducing amplifiers 103 and 107). In the HDD, a top cover 121 has no notched window for a servo writer. Nor is notched window for a reference signal head formed since this HDD does not need a conventional servo writer. Preservo information PS (described later) is recorded in the disk 101 of the HDD.

The components of the self-servo writing function will be described by referring to FIG. 3. The self-servo writing section includes a servo pattern generating unit 104, a recording timing generating unit 105, a real/virtual servo pattern storage unit 106, a signal processing unit 108, a learning storage unit 109 and a writing position generating unit 110. The learning storage unit 109 has a recording timing correcting unit 109a, a track pitch calculating unit 109c and memories 109b and 109d. This self-servo writing function is performed by the head amplifier including the recording and reproducing amplifiers 103 and 107 during a normal HDD operation. To record and reproduce servo information, a head positioning control unit 111 is used. The components to be employed are switched between a time for execution of the self-servo writing function (a time for processing of self-servo writing) and a time for normal data writing/reading (a time for normal processing) by means of a switch 115 (described later).

The head positioning control unit 111 controls a VCM driver 114, positioning and controlling the head 102 at a target position of the disk 101, based on servo information (a burst pattern) reproduced from the disk 101 by means of the head 102. During the self-servo writing, the head positioning control unit 111 inputs positioning information from the writing position generating unit 110 and controls positioning of the head 102. The real/virtual servo pattern storage unit 106 stores a real servo pattern (servo information SD) actually used by the HDD to position and control the head 102 during data recording/reproducing. The unit 106 stores a virtual pattern (virtual servo information SP) as well. As shown in FIG. 13, the servo information SD includes patterns S continuous between adjacent tracks such as a cylinder address code, a sector/index pattern and the like and burst patterns A to D. The burst patterns A to D are bits of information for generating positional information used to position and control the head 102 on the center of the track. The servo pattern generating unit 104 outputs a recording signal corresponding to the real servo pattern SD or the virtual servo pattern SP to the recording amplifier 103, in synchronization with a recording timing signal from the recording timing generating unit 105. The recording amplifier 103 in turn amplifies the recording signal and outputs this to the head 102. The head 102 writes the real servo pattern SD or the virtual servo pattern SP on the disk 101. The signal processing unit 108 is for processing a signal sent from the reproducing amplifier 107 for the purpose of reproduction.

For this HDD, as described above, switching is performed between the self-servo writing processing and the normal processing by means of a switching operation of the switch 115. More specifically, during self-servo writing, the switch 115 connects the recording amplifier 103 to the servo pattern generating unit 104, and the reproducing amplifier 107 to the signal processing unit 108. During normal processing, the recording amplifier 103 is connected to a recording signal processing unit 116, and the reproducing amplifier 107 is connected to a reproducing signal processing unit 117. The recording signal processing unit 116 and the reproducing signal processing unit 117 are respectively structured by circuits similar to those for processing recording and reproducing signals in the conventional HDD.

The switch 115 performs switching in accordance with a control of a control unit ($\mu$CPU) 118 for controlling the entire HDD. The control signal is supplied to the switch 115 from the control unit 118 via the head positioning control unit 111. Note that the control signal may be applied to the switch 115 directly. In the HDD shown in FIG. 13, the head 102 is positioned in a way during a self-servo writing processing and in another way during a normal time. Thus, the control unit 118 and the head positioning control unit 11 are treated as separate components. In order to provide a positioning processing function during self-servo writing processing, however, the control unit 118 may be structured as having the head positioning control unit 111. For both the control unit 118 and the head positioning control unit 111 too, switching is performed between a sampling frequency (Fdrv) during normal processing and a sampling frequency (Fss) during self-servo writing processing.

Next, an explanation will be given of the self-servo writing processing of the HDD having the above-described structure, with reference to the drawings.

First, preservo information is recorded in the disk 101 as a recording medium (step S1). For recording of this preservo information, for instance, as shown in FIG. 17, preservo information can be simultaneously written in a plurality of disks 101 by using a spindle motor having the plurality of disks 101 loaded thereon and capable of rotating and an actuator capable of moving and controlling a plurality of heads placed opposite from the respective disk faces of the disks 101 mounted on this spindle motor. The disks 101 in which preservo information has been written are loaded on the HDD.

Then, by using the preservo information written in the disk 101, parameters such as an amount of motion of the head 102 (a track pitch), a recording timing, and an amount of time delay are measured and detected (step S3). The HDD executes, based on the measured and detected parameters, self-servo writing processing (step S4).

This self-servo writing processing is repeated until data are written on the entire surface of the disk 101 (step S5, NO). Upon completion of the self-servo writing on the full surface of the disk 101 (step S5, YES), the switch 115 changes the mode to a circuit structure for normal processing (a normal mode) (step S6). The self-servo writing is thus finished.

The head moving amount indicates, as it is necessary to write the servo information and the virtual servo information on the disk at predetermined intervals (in a radial direction), these predetermined intervals (a pitch amount).

Each step relating to the self-servo writing processing will be described in detail.

Figure 12:
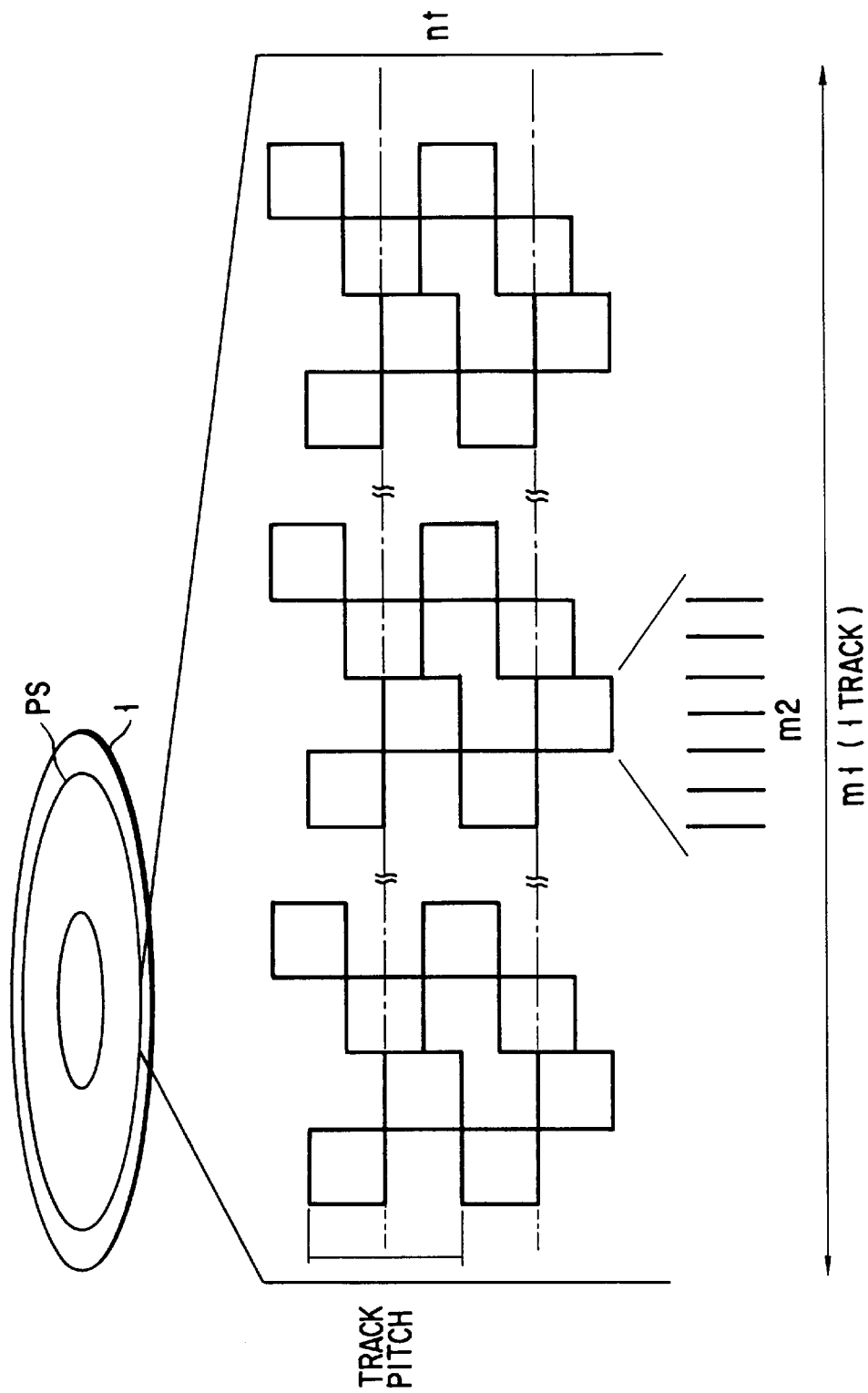
FIG. 12 is a conceptual view illustrating preservo information in the disk drive of the embodiment.

First, the preservo information written in the disk 101 in step S1 will be explained. As shown in FIG. 12, the predetermined number (m1) of preservo information PS per a track is recorded beforehand on, for instance, an outer peripheral side, on the disk 1. As shown in FIG. 13, the preservo information PS is a combination of the real servo information SD and the virtual servo information SP, both recorded in one round of a track.

The preservo information PS is, as shown in FIG. 13, usually recorded in at least two tracks when a boundary between the bursts A and B is a track center. The virtual servo information SP of the preservo information PS is made of, for instance two-phase patterns Pa and Pb and recorded in a staggered fashion by the head width of the head 2 (an overlapped portion in the recording direction of the disk 101).

A sector shown in FIG. 13 is set according to HDD specifications. Repetitions of staggered patterns Pa and Pb of the virtual servo information SP in a sector are set based on the number of samples necessary during servo information writing.

As previously described, the preservo information PS is written in a highly accurate manner in a stage prior to incorporating the disk 101 in the HDD and can be reproduced by means of the head 102. The preservo information PS has a frequency higher than the rotation asynchronous vibration frequency Fnrro of the spindle motor and than other vibration frequencies produced when the HDD is used. The frequency of the preservo information is made of m1 pieces which can satisfy a sampling frequency Fpp capable of sufficiently absorbing the vibration frequency component. A relationship is expressed by the following formula:

$$m1 \geq Fpp \times 60/\text{rpm} \qquad (1)$$

rpm: motor revolving speed

Each piece of preservo information PS made of m1 pieces is constituted by a signal made of m2 pieces whose amplitude value can be detected. The number nt of continuous tracks including the preservo information is, according to device specifications, two tracks or more which allow a track pitch of the HDD to be accurately measured, or 1/10 the total number of tracks na or less. The number nt of continuous tracks of the preservo information PS may be written in over several positions on the disk 1.

Figure 5:
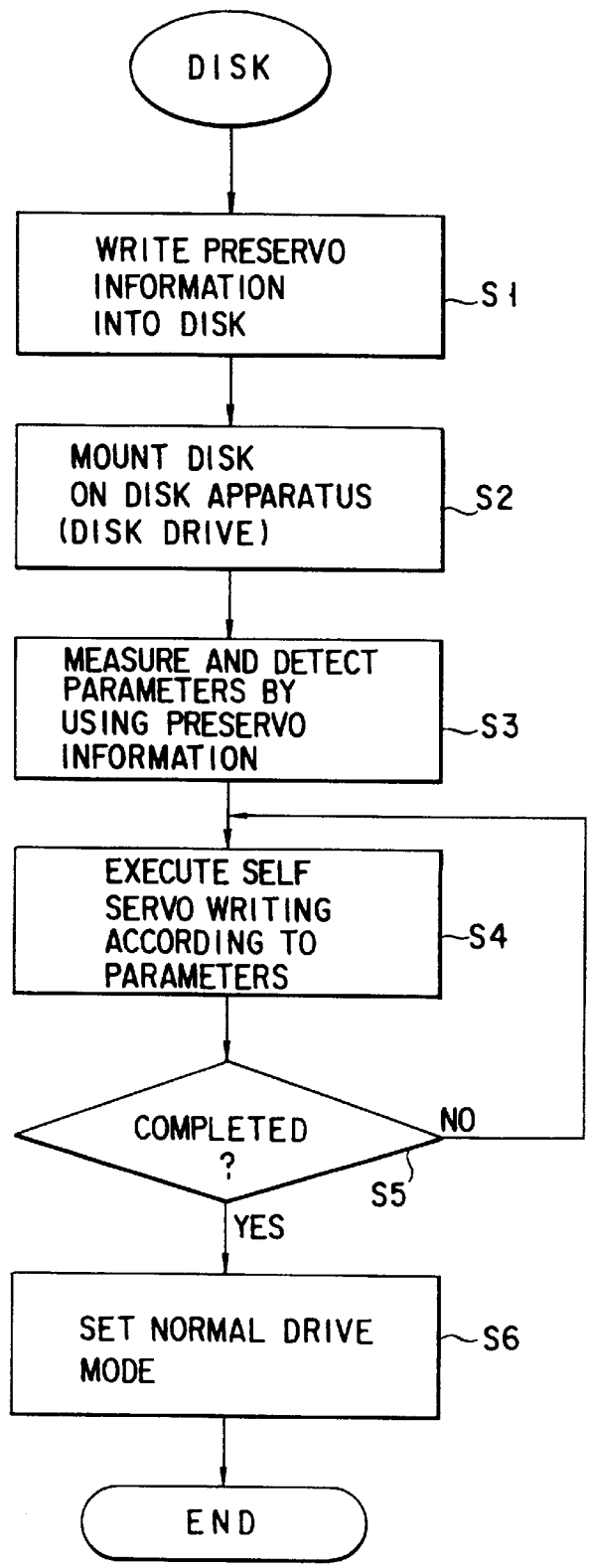
FIG. 5 is a flow chart showing a processing relating to a self-servo writing function in the disk drive shown in FIGS. 3, 4A and 4B.

Next, explanation will be made of measuring and detecting of various kinds of parameters in step S3 in FIG. 5. In particular, detection of a moving pitch will be described below. A value needed for setting a track pitch to a predetermined pitch depending on an HDD is an amount of motion, indicating an amount needed for moving the head 102 at this pitch interval. The moving pitch means this pitch interval.

Figure 6:
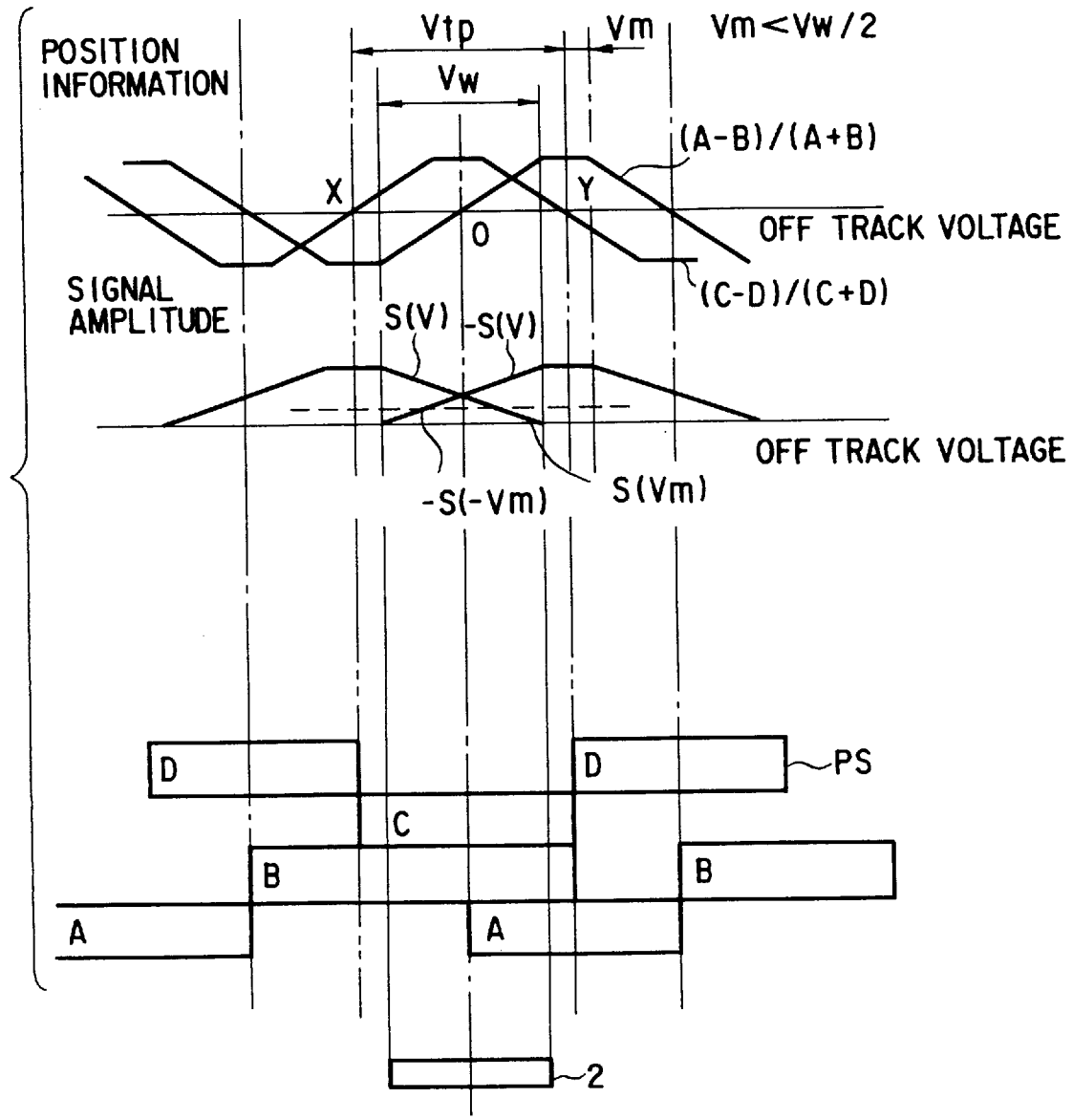
FIG. 6 is a conceptual view illustrating preservo information in the disk drive of the embodiment.

As previously described, the preservo information PS may be written in nt tracks which are only parts of the disk 101. For convenience it is assumed that this is written in an outermost peripheral position. FIG. 6 shows a relationship between the burst signals (A to D) contained in the preservo information PS and a position of the head 102 and a relationship between a burst signal amplitude and positional information during off-track time.

The head 102 is turned on-track by means of the head positioning control unit 111 shown in FIG. 3 in a position where signal amplitudes of the burst signals A and B are equal to each other. In this state, the head positioning control unit 111 moves the head position while a voltage is being applied by an off-track voltage applying unit. Then, the track pitch calculating unit 109c measures a relationship between the off-track voltage and a signal amplitude of the preservo information PS and stores this in the memory 109d. In this way, one track pitch is equivalent to X-Y, a head width extends just before saturation of a position signal and thus off-track voltages Vtp and Vw for moving the head by corresponding distances are obtained. That is, Vtp is equivalent to a track pitch width and Vw is equivlent to a head width (a real track width). Here, the track pitch means a track pitch in an actual HDD, that is, Tp.

Then, a moving pitch is calculated from the off-track voltage obtained during previous processing. The moving pitch is half the track pitch width in the embodiment. Thus, a track pitch margin Vm is calculated by the following formula under the condition of Vm<Vw<2:

$$Vm=(Vtp-Vw)/2$$

Figure 8A:
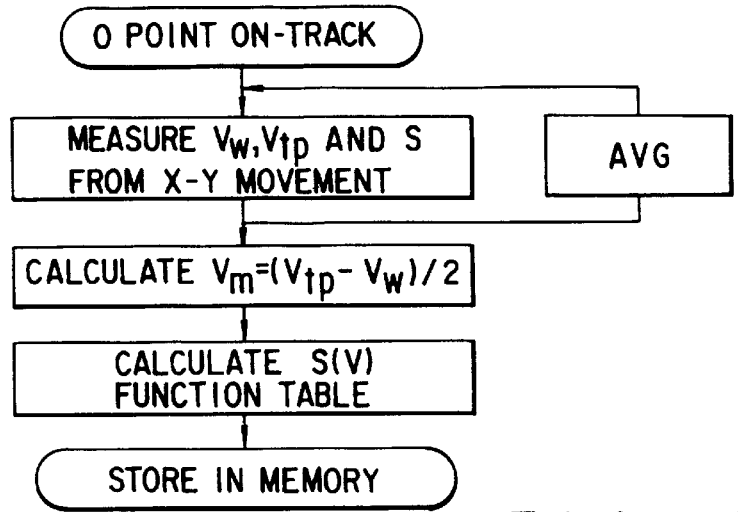
FIGS. 8A and 8B are flow charts illustrating operations of measuring and detecting a parameter shown in the flow chart of FIG. 5 and writing information.
Figure 8B:
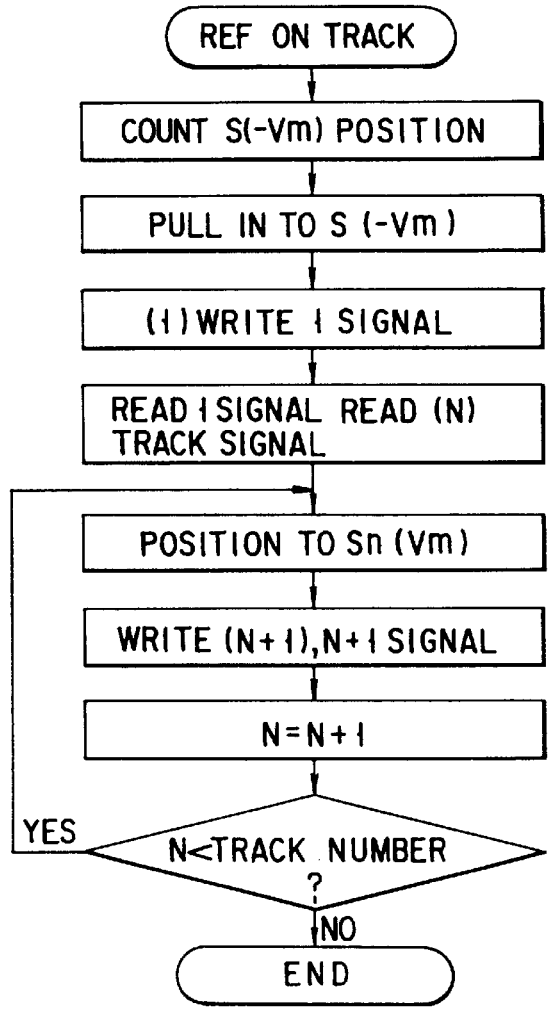

An amplitude value S (Vm) obtained when the head moves off-track from an on-track position by Vm is a moving amount amplitude value in a case where the head 102 is on a right side edge with respect to an optional positional signal. -S (-Vm) is a moving amount amplitude value in a case where the head 2 is on a left side edge. In this case, in a magnetic head having symmetry in reproducing amplitude values, the following formula applies (see FIG. 8A):

$$S(Vm)=-S(-Vm)$$

Here, a position signal is generated based on burst signals. For instance, when a position signal is generated by using the burst signals A and B, the position signal is defined as follows:

$$(A-B)/(A+B)$$

The same is true when the burst signals C and D are used. A position where the position signal is 0 is defined as an on-track position (similar to definition in the servo system of the HDD). The moving amount amplitude value means, in a position where the head is turned off-track by a moving amount with respect to an optional position signal, a signal amplitude value when an arbitrary signal is reproduced. This moving amount amplitude value ($\pm$S) is stored in the memory 109d as a moving amount and when transfer positioning of the head 101 is controlled by using the virtual servo information, the head is positioned and controlled by referring to a content in the memory.

As the moving amount, a value of "length" should be used. In the moving amount measuring processing, however, it is measured only by a "voltage" unit. Usually, a "length" unit is employed when a positioning accuracy relating to servo processing is considered. In the embodiment, however, a value is corrected by performing conversion between a voltage and a length for the position signal and thus, even when a "voltage" value is explained, it is equivalent to the case where a "length" value is used.

The transfer positioning indicates a positioning operation of gradually moving from one position to another (by shifting positioning points). Therefore, this is not used for digital movement among positioning points (for instance, a jump from a 10th track to a 100th) but used for analog movement between adjacent tracks (for instance, from a 10th track to a 11th or to a 9th). The transfer positioning is thus slower than the jumping movement even among a plurality of tracks.

The servo information writing processing in step S4 in FIG. 5 will be explained. In this operation, the positioning of the head 102 is controlled based on the moving pitch obtained by the previous processing. The servo information (a servo pattern) is then written at a predetermined position on the disk 101. This processing will be described with reference to FIG. 7.

In the embodiment, a portion of the preservo information is used as a positioning burst signal contained in the servo information based on HDD specifications. There are two positioning control methods using the preservo information.

The first is a method utilizing the virtual servo information of the preservo information from the beginning of writing processing. More specifically, in FIG. 7, if a previous processing is finished at servo patterns A, B, C and D and -2, -1, 0 and 1, a signal amplitude of a virtual pattern is detected and a positioning mode is switched ON in a S (-Vm) position. By transfer-controlling the head in this state, the head is turned on-track in an H2 position. S (Vm) of virtual servo information (1) is used for the detected signal amplitude at this time. In the on-track state overwriting is executed with writing of a servo pattern (2) of real servo information SD and a virtual servo pattern 2 of the virtual servo information SP is written in the disk 101.

The second method is to perform positioning by using the servo information of the preservo information and a processing is transferred to a positioning control mode using the virtual servo information. More specifically, the head is turned on-track in a position H0 by using the A and B phase burst patterns and from this state a processing is transferred to the positioning control mode which uses the virtual servo pattern. After transfer, a signal of a virtual servo pattern (1) is detected and the head is turned on-track in a position H2. Then, overwriting is executed with writing of a servo pattern (2) of the real servo information SD and the virtual servo pattern 2 of the virtual servo information SP is written.

Figure 7:
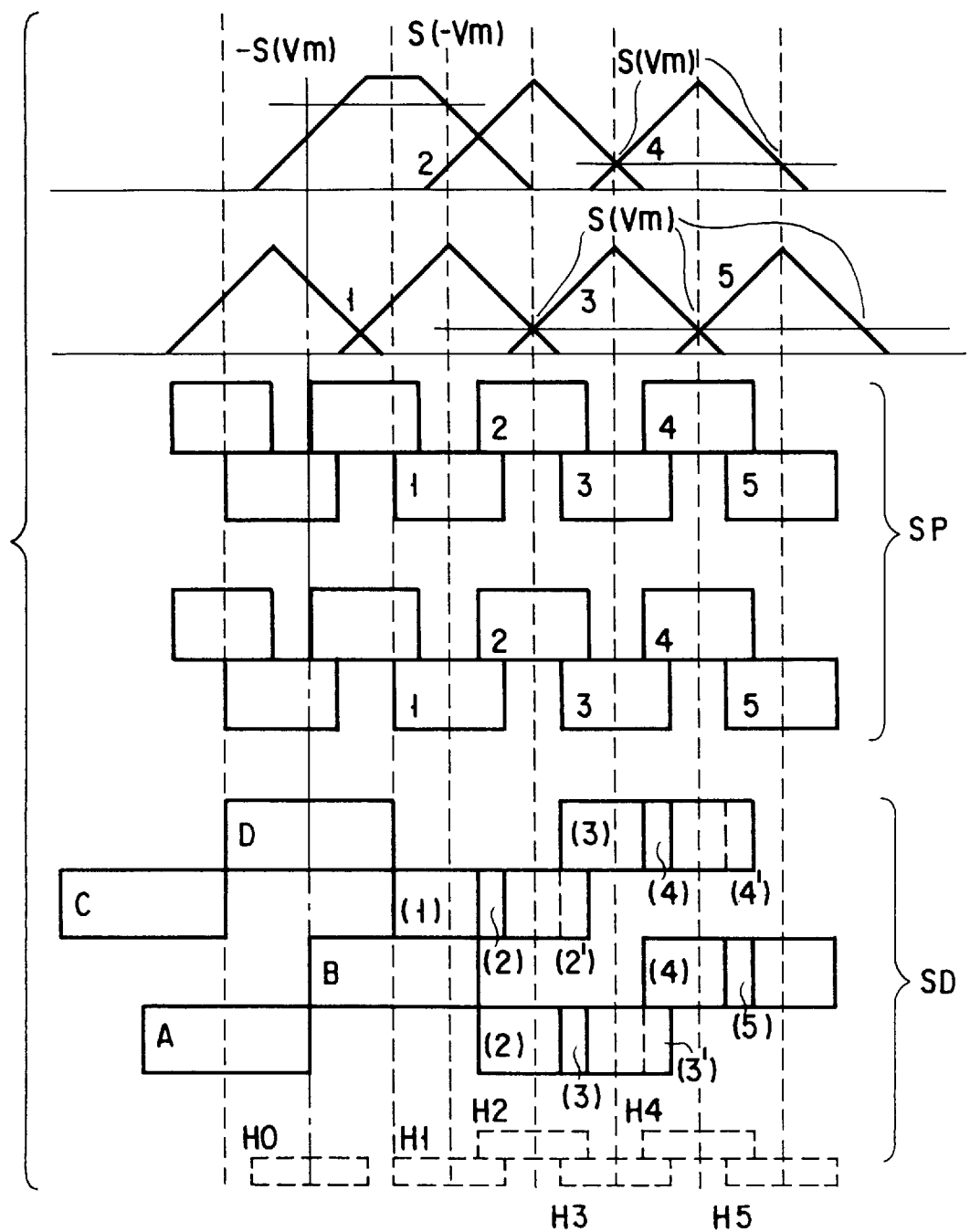
FIG. 7 is a conceptual view illustrating a self-servo writing operation in the disk drive of the embodiment.

As this process is repeated, the head 102 is positioned and controlled based on a current virtual servo pattern and a servo pattern of the real servo information SD in a next track is written (see FIG. 7 (B)). At this time, writing is carried out up to a last track position by accurately maintaining a track pitch set according to HDD specifications and sufficiently limiting a Non Repeatable Run Out $\sigma_{NRRO}$ produced during writing and an unnecessary vibration component $\sigma_{etc}$ also produced during writing.

The process for writing the servo information will now be described in detail, with reference to FIG. 3 and FIGS. 14 to 16. In the learning storage unit 109 shown in FIG. 3, an amount of motion calculated by the track pitch calculating unit 109c is stored in the memory 109d by means of the measuring processing based on the preservo information recorded on the disk 101.

Figure 14:
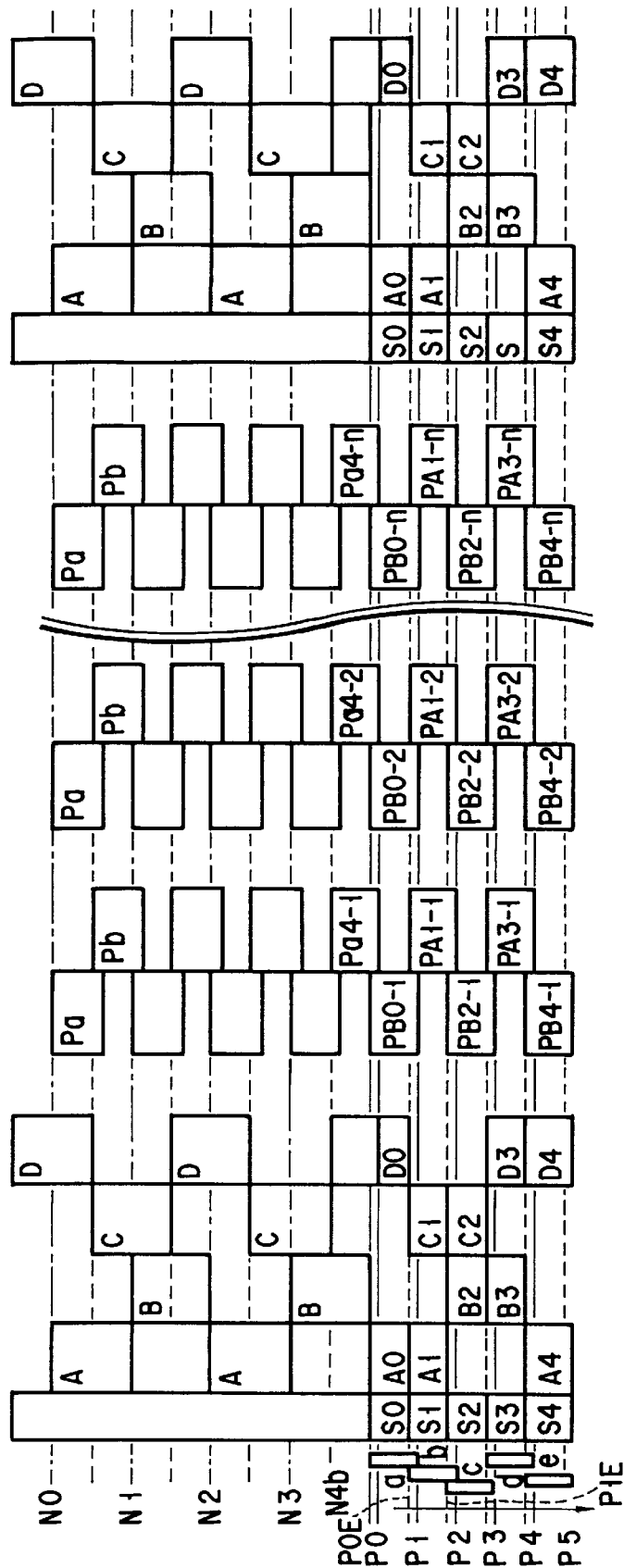
FIG. 14 is a conceptual view illustrating a self-servo writing operation in the disk drive of the embodiment.

In FIG. 14, first the center of the head is moved to and positioned in a track N3 by utilizing the burst pattern of the preservo information. Then, the writing position generating unit 110 shown in FIG. 3 supplies a position, at which the head 102 is positioned, to the head positioning control unit 111 based on the moving amount stored in the memory.

The head positioning control unit 111 positions and controls the head 102 at a proper writing position (a head position as shown in FIG. 14). At this time, the head 102 reproduces a signal of a virtual servo pattern Pa4 on a portion held between a track N4 and P0. The head positioning control unit 111 executes the above-described positioning control by comparing a reproduction output from the head 102 and the moving amount stored in the memory 109d.

At the head position a, the head 102 writes a servo pattern outputted from the servo pattern generating unit 104 in synchronization with a pattern writing timing outputted from the recording timing generating unit 105. The servo pattern to be written is, as shown in FIG. 14, patterns S0 whose phases must coincide with each other between adjacent tracks, A0 and D0 of the burst patterns or a virtual servo pattern PB0.

The servo pattern cannot be recorded during executing of positioning control and thus the head positioning control unit 111 positions the head 102 based on a virtual servo pattern Pa4-1 reproduced by the head 102. Virtual servo patterns PB0–2 are continuously written. Likewise, the head 102 is positioned based on a reproduced virtual servo pattern Pa4-2, and virtual servo patterns PB0–3 are written. Such virtual servo pattern reproduction and a writing sequence make it possible to write servo patterns and virtual servo patterns equivalent to one track.

Next, explanation will be made of a processing for writing servo patterns of a next track by using the recorded virtual servo pattern PB0.

By means of the above-described processing, the head 102 is placed in the head position as shown in FIG. 14. In this state, the head positioning control unit 111 places the head 102 in a head position b on a portion held between P0E and P1 by using a reproduction output of the virtual servo pattern PB0. This positioning operation is the same as in the previous track.

In this head position b, the head 102 records the servo patterns S1, A1, and C1 of the real servo information SD in the disk 101. At this time, of the previously recorded servo pattern D0 a portion held between P0E and P1 is erased. Also, a virtual servo pattern PA1 is recorded in accordance with a positional relationship with the PB0 shown in FIG. 14. In this case, reproduction, positioning, and a recording sequence are the same as in the previous case.

By the same procedure as above, the head positioning control unit 111 places the head 102 in a head position c and records servo patterns S2, B2, C2, and PB2. At this time, of the previously recorded servo pattern A1 a portion held between PE1 and P2 is erased.

Furthermore, the head positioning control unit 111 executes similar operations for head positions d and e and records servo patterns S0 to S4, A0 to A1, B2 and B3, and C1 and C2 of the real servo information SD. Then, a portion of a burst signal D is recorded on the D3 and D4 units. That is, when a portion held between P5 and P4E (not shown in the drawing) is erased from the servo pattern D4 during a next process, a burst pattern D4 of the real servo pattern SD is realized.

Figure 15:
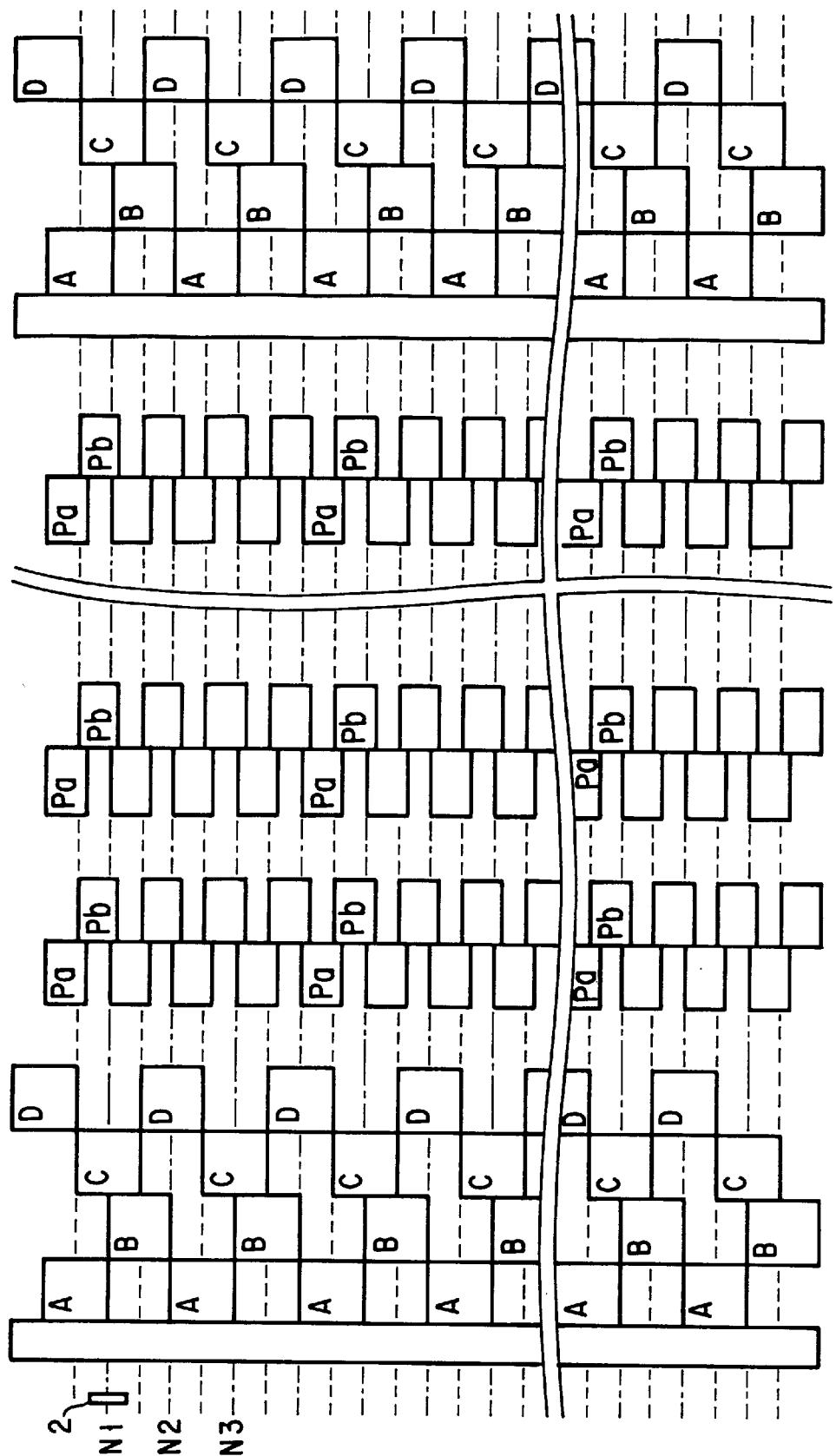
FIG. 15 is a conceptual view illustrating a self-servo writing operation in the disk drive of the embodiment.

By repeating this processing, the real servo information SD and the virtual servo information SP necessary for the HDD are recorded in all tracks of the disk 101. Moreover, recording can be carried out by maintaining a predetermined track pitch. FIG. 15 shows a state where the real servo information SD and the virtual servo information SP are recorded in all the tracks.

Figure 16:
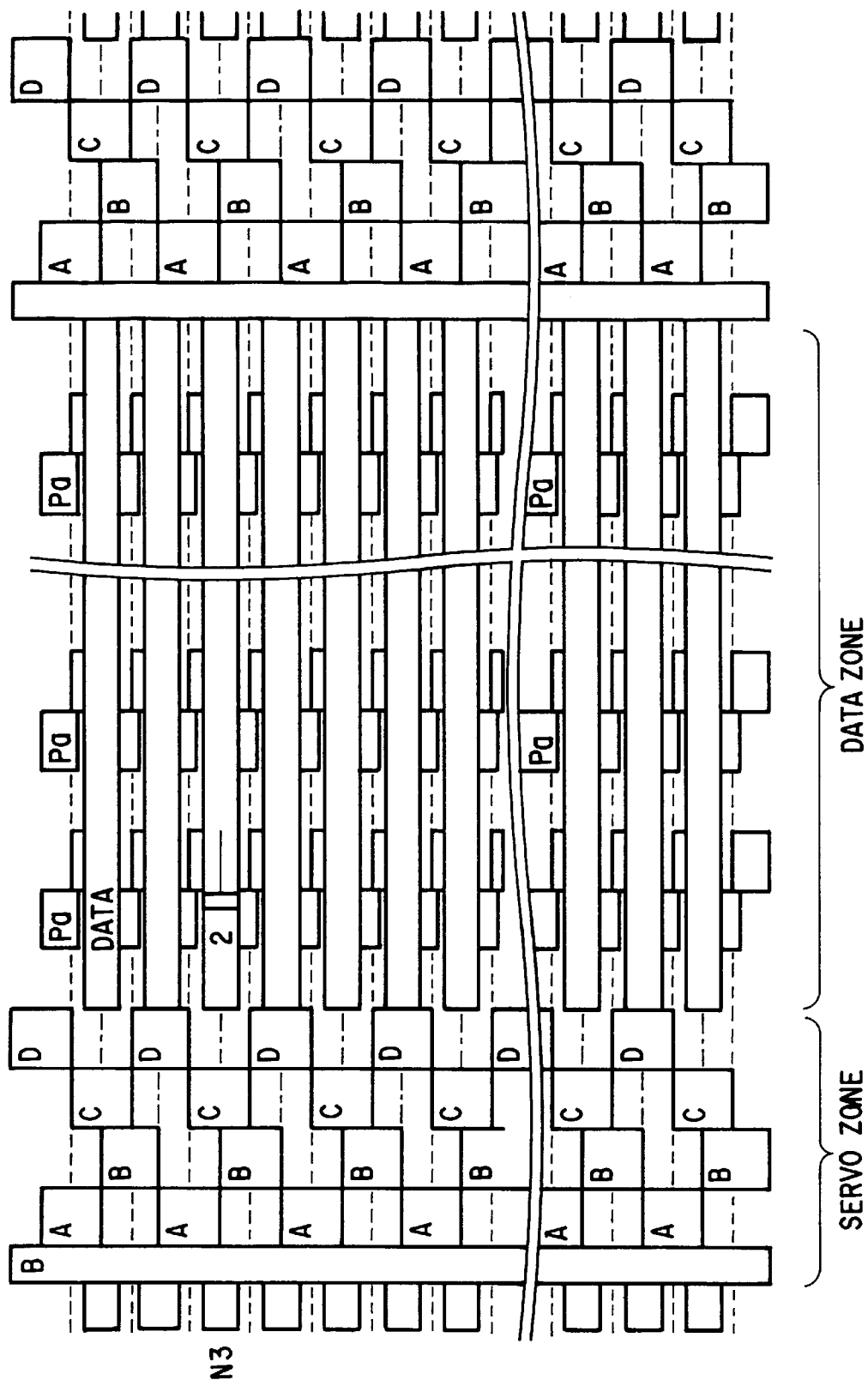
FIG. 16 is a conceptual view illustrating a self-servo writing operation in the disk drive of the embodiment.

FIG. 16 shows a relationship between servo information (a servo zone) and user data (a data zone) used by the disk 101 when the HDD is actually operated after the servo information has been recorded. In FIG. 16, the head 102 is positioned in a track N3 and currently engaged in reproducing data. During the previously described writing of the servo information, the virtual servo information is recorded is erased from the data zone by overwriting user data. Thus, there is no possibility that actual data recording/reproducing operations will be affected by the virtual servo information. Also, the virtual servo information not overwritten but remaining in the data zone is outside the range of the servo zone and thus it is unlikely that a head positioning control operation executed based on the servo information will be affected by this.

Next, how to set the virtual servo information will be described. In the preservo information PS explained by referring to FIG. 12, the predetermined number (m1) of bits of virtual servo information per track is recorded. According to this method for setting the number M of bits of virtual servo information, if the number of bits of virtual servo information satisfying a required servo band is M1 before S/N improvement and a coefficient of a virtual servo information number necessary for S/N improvement is K, the total number of bits of virtual servo information is set to M≧K×M 1. A frequency Fss for sampling last servo information is calculated, if a revolving number of the spindle motor is Rpm, by the following formula:

$$Fss = M \times Rpm/60$$

By sampling these M pieces of virtual servo information, calculating an average value of K pieces and obtaining positional error information, the servo band during positioning and controlling of the head 102 is expanded more than that of HDD specifications, accurate positioning control is performed in a state where S/N has been improved and servo information having an excellent signal quality is written in the disk 101.

The number M1 of virtual servo information sets a coefficient K of S/N improvement in accordance with the formula (1) which can limit $\sigma_{NRRO}$ and $\sigma_{etc}$ as follows: In order to improve accuracy for detecting positioning, a signal S/N ratio is SN (ON) when servo information set according to HDD specifications is reproduced by a full width of the magnetic head, a track width contributing to signal reproduction at this time is Ton, S/N is SN (OFF) when the servo information is reproduced by the head 2 in a virtual position and a track width contributing to signal reproduction at this time is Toff. If a system noise is Nsys and a media noise Nm, each S/N is shown as follows. The virtual position means a position transfer-positioned based on the virtual servo information and the moving amount. It is similar to the position in the previously described positioning processing or the transfer-positioning processing.

$$SN(ON) = 20\log(Son/Non)$$
$$= 20\log(Son/\sqrt{(N\text{sys}^2 + Nm^2)})$$
$$Soff = Son \times Toff/Ton$$
$$Noff = \sqrt{(N\text{sys}^2 + (Nm \times Toff/Ton)^2)}$$

Then, the following is obtained:
SN (OFF)=20log (Soff/Noff)
In order to improve S/N in the virtual position, a virtual positioning information coefficient k is obtained by the following formula:

$$k=10^{(SN(ON)/20)}/10^{(SN(OFF)/20)} \quad (2)$$

When all pieces of virtual servo information are written in one round of a track, if the number of the virtual servo information is masp, the virtual servo information number M is, according to the formulas (1) and (2), obtained by a formula (3) and a sampling frequency Fss at this time must satisfy a formula (4):

$$K \times M1 \leq M \leq \text{masp} \quad (3)$$

$$Fss \geq M \times Rpm/60 \quad (4)$$

In the embodiment, servo information of a next track can be written while positioning and controlling the head 102 in the transfer position, and it is possible to perform positioning at a sampling frequency Fss at this time, as shown by the formula (4), higher than a sampling frequency Fsr for obtaining servo information necessary for actually using the HDD.

This makes it possible to sufficiently limit a spindle motor rotational vibration frequency component Fnrro contained in servo information and emerging during writing of the servo information and an unnecessary vibration frequency component generated during writing of the servo information and an environmental vibration component Fetc, which have been hindrances to using the conventional servo writer. As a result, the servo information is written in a transfer positioning control state, utilizing the virtual servo information, by means of the self-servo writing function of the HDD and using a sampling frequency equivalent to Fsr or higher. Unnecessary vibration components which adversely affect positioning accuracy in actually using the HDD are thereby eliminated, making it possible to obtain servo information very high in quality.

Furthermore, it is also possible to use the virtual servo information written in each sector without executing any changes to the conventional HDD by means of preformatting when actually using the HDD.

Figure 9:
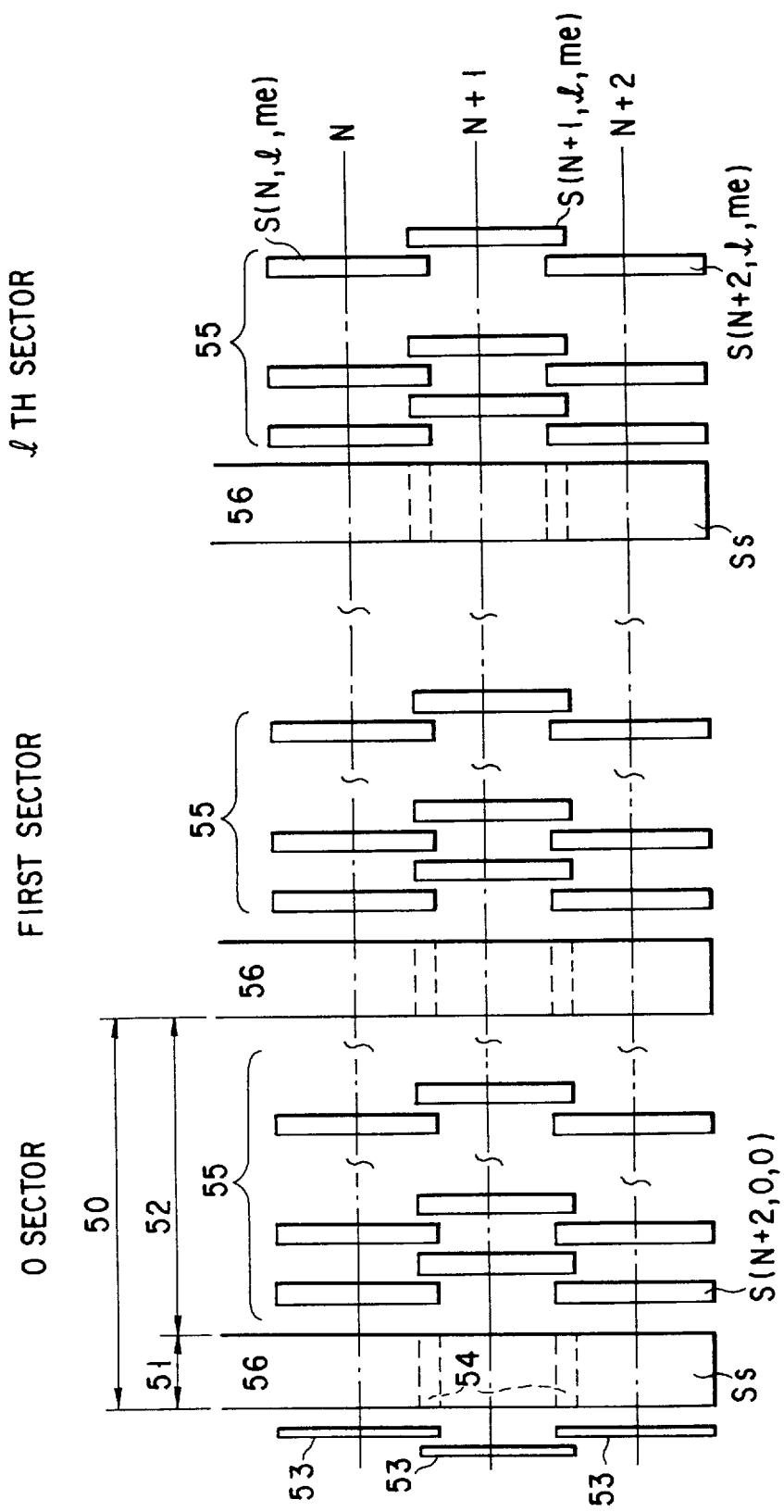
FIG. 9 is a conceptual view illustrating a causal relationship of a procedure for writing virtual servo information in the disk drive of the preferred embodiment.

Next, the causality of the sequence for writing the servo information and the virtual servo information will be explained with reference to FIG. 9. In FIG. 9, 50 is a sector area, 51 is a servo information area (a servo zone) contained in a sector, 52 is an area used as a data zone, 53 is a head position to be determined, 54 is an area of the servo information in which overwriting is carried out and 55 is the virtual servo information.

The number I of sectors per track is set according to HDD specifications while the number M of virtual servo information can be arbitrarily set as previously described. It is now assumed, for instance, that servo information of a track N and a sector L is Ss (N, L) and virtual servo information contained in the track N and the sector L is Z, that virtual positioning information of an even-number track is Se (N, L, Z) and that of an odd-number track is So (N, L, Z) and that the number of sectors per track is 0 to 1 and the number of virtual servo information per sector is 0 to M1.

First, assuming that the servo information and the virtual servo information of an N track position is written, the head 102 is transfer-positioned in an N+1 track position while at this time the virtual servo information So (N+1, L, Z) is written after a position is determined with the Se information (N, L, Z) as last positioning information (last information when transfer-positioning is performed). It is usually impossible to simultaneously execute the writing of information and the positioning of the head (reproducing of a signal). Thus, a signal is reproduced up to just before reaching an area in which writing is to be made and in the writing area a signal reproducing processing is not carried out. In the case of writing virtual servo information of Z=0, the virtual servo information a sector before is one "just before the writing area."

Then, the Se (N+2, L, Z) information is written after a position is determined with the So (N+1, L-1, Z) as last servo information when Z=0 or after a position is determined with So (N+1, L, Z-1) as last servo information when Z≧1.

When servo information Ss (N+1, L) is written, Seoro (N+1, LL-1, Z) is used as last servo information. The Seoro means a signal of "Se or So". Here, the phases of the Ss information must be aligned in the radial direction of the disk 101. Therefore, the virtual servo information necessary for determining a position just before may be even-numbered and odd-numbered tracks. In order to write the servo information and virtual servo information belonging to an optional sector, some pieces of the virtual servo information belonging to a sector just before may be used as last servo information.

The virtual servo information to be written in a next transfer position is written with a timing which is shifted from the virtual servo information referred to in transfer positioning just before, making it possible to write the servo information and others while controlling transfer positioning and to perform highly efficient writing of the servo information.

Next, the timing for writing (recording) the servo information will be explained with reference to FIG. 10 and in connection with the operations of the recording timing correcting unit 109*a* and the recording timing generating unit 105 shown in FIG. 3.

Figure 10:
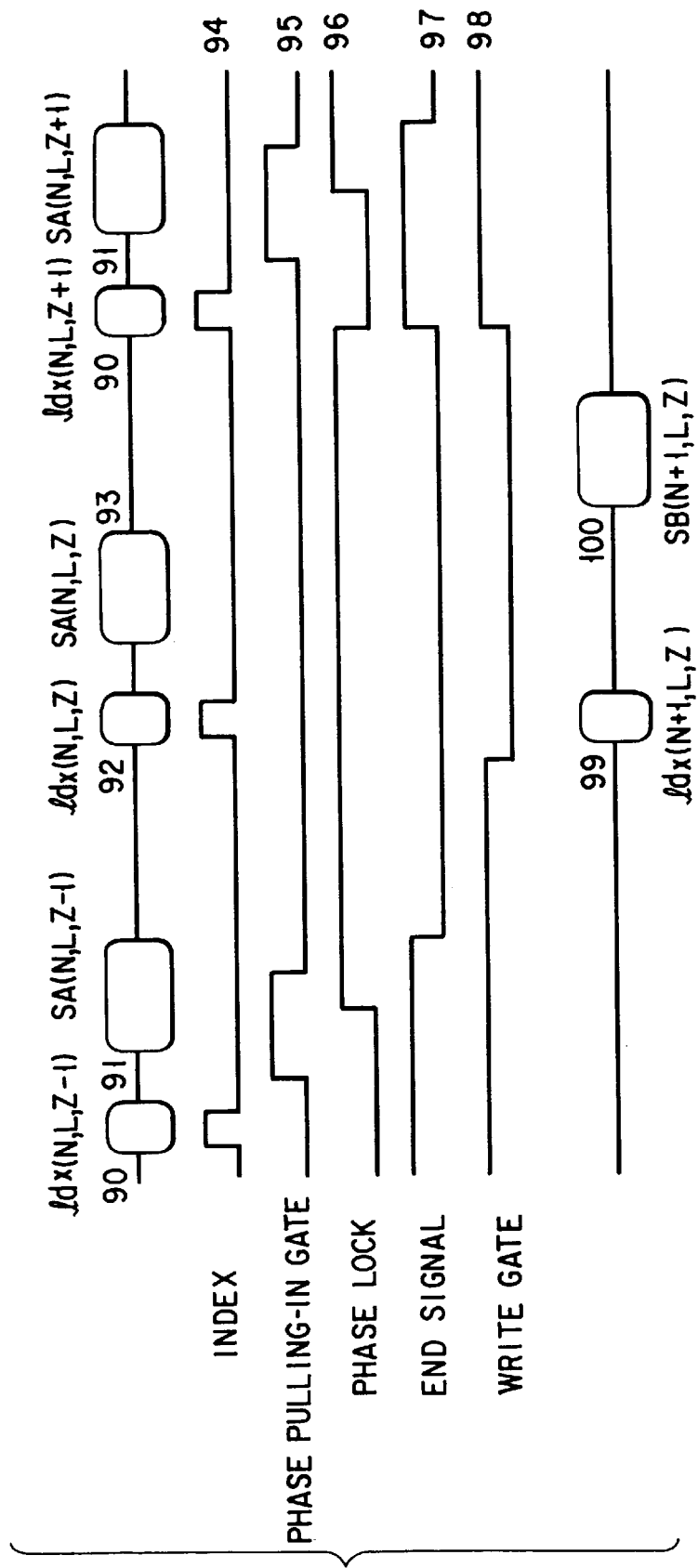
FIG. 10 is a timing chart illustrating a timing for writing servo information in the disk drive of the embodiment.

FIG. 10 is a view illustrating a timing for writing the virtual servo information in an optional transfer position by using a clock signal obtained from the virtual servo information via a phase synchronizing unit therein. 90 and 92 are indexes set in optional servo information, and 91 and 93 are burst patterns used for virtual positioning and respectively for odd-number and even-number tracks. 94 is an index pulse binarized from 90, 95 is a phase pulling-in gate in the phase synchronizing unit, 96 is a phase locking signal, 97 is a finishing signal for the virtual servo information of 91, 98 is a writing gate, and 99 and 100 are index information of the virtual servo information of a next track and a burst pattern.

In FIG. 10, information for which phases always need to be aligned between adjacent tracks is an index unit. First, if the virtual servo information of an Nth track has been written, the head 102 is positioned in a next transfer position based on the burst patterns 91 and 93. At this time, with the index pulse 94 as a reference, the phase pulling-in gate 95 is opened and phase pulling-in is started for the virtual servo information 91. After the phase pulling-in is finished, the phase lock signal 96 is sent and phases of the writing timing signals are made accurately coincident with the virtual servo information.

Then, when a pulse counting-up signal of the virtual servo information is sent, the writing timing signals whose phases have been locked are counted by a preset number. The writing gate 98 is thereby opened. The writing gate 98 is, as shown in FIG. 10, opened at a position where the Zth virtual servo information is written and in this position, the index unit 99 and the burst pattern 100 of the virtual servo information of the N+1 track are written.

By generating the writing timing from the virtual servo information and writing the Zth virtual servo information of a next track, it is possible to write the virtual servo information in all the sectors by rotating the spindle motor twice.

Next, explanation will be made of a processing executed in the recording timing correcting unit 109a shown in FIG. 3. In accordance with the writing timing, the servo information and the virtual servo information are written in the transfer position. However, a writing timing error will be generated when the information is written by means of the head and the circuit system.

Figure 11A:
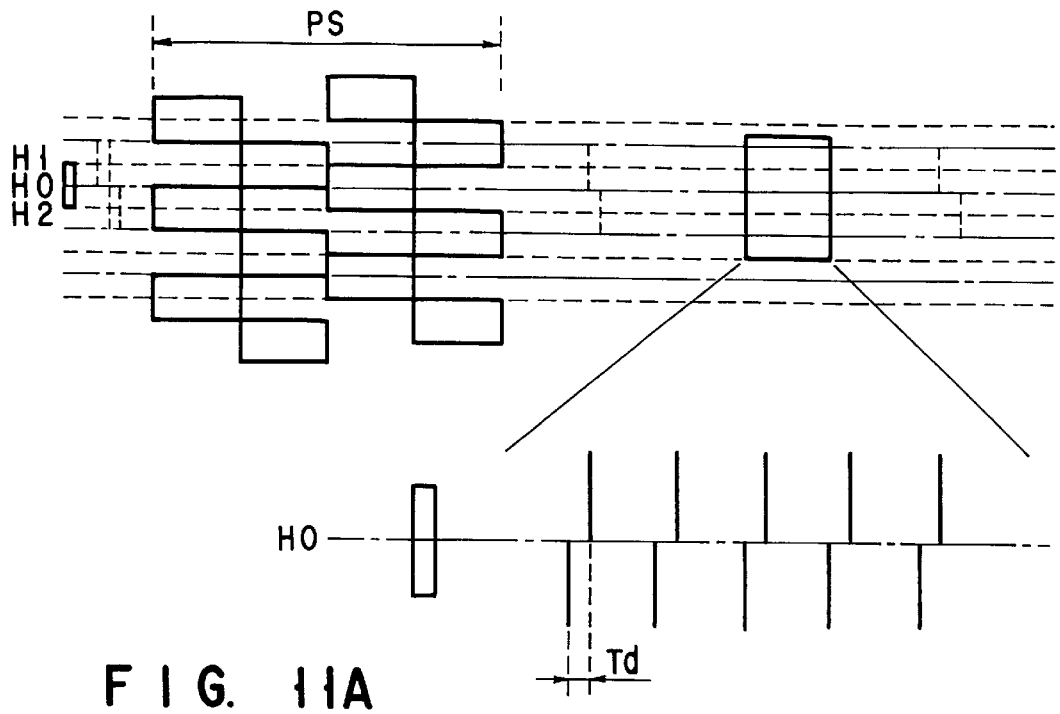
FIGS. 11A and 11B are views illustrating a correction of a writing timing in the disk drive of the embodiment.
Figure 11B:
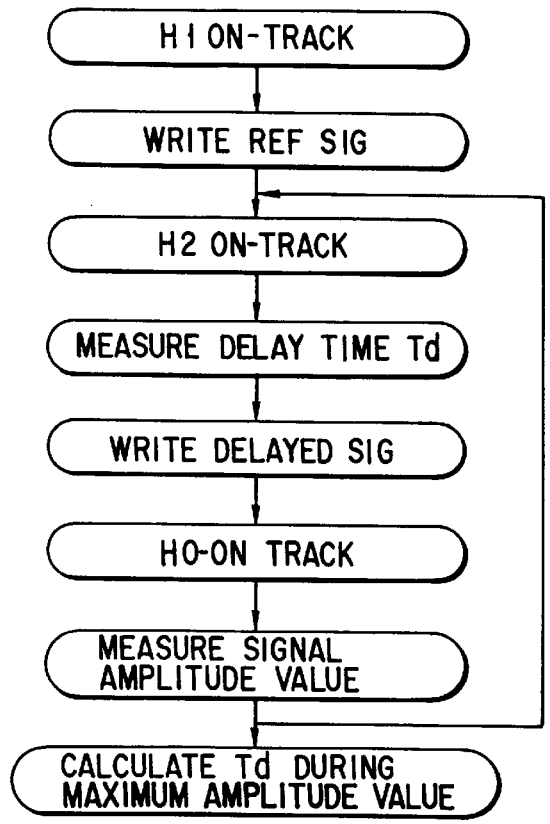

FIG. 11 is a view illustrating the recording timing correcting unit 109a for correcting the writing timing error. First, the recording timing correcting unit 109a turns the head 102. on-track in a position H1 by utilizing the preservo information PS. Then, in the recording timing generating unit 105, a reference signal set according to the preservo information is written in synchronization with the writing timing signal. Then, with the head turned on-track in a position H2, a signal to be measured is written at a frequency similar to that for the reference signal in synchronization with the writing timing signal after an optional time delay Td. Then, with the head turned on-track in a position H0, amplitudes of both signals are measured on a boundary between the reference signal and the signal to be measured.

This measuring process is repeatedly executed by changing the time delay Td and a time delay Td by which the signal amplitude in the position H0 is largest is obtained. The time delay Td thus obtained is used for correcting the writing timing during writing of the servo information as a writing (recording) timing correction amount.

In time delays Td there are produced differences among HDDs because of a geometrical relationship among the HDD head, the spindle motor and the actuator and a response of the circuit system. Since there is no big difference in geometrical relationships, however, it is possible to estimate a delay in an optional radial direction from the outer periphery of the disk to the inner periphery when a time delay is measured in any position of the disk. FIG. 18 shows a curve of an example for estimating such a time delay.

When the head travels over the disk, writing of the servo information is delayed by a proper amount with respect to a head locus in order to provide signals reproduced by the head with continuity. This time delay amount is, as shown by a curve a in FIG. 18, is uniquely determined by such geometrical forms as the rotational centers of the head, the spindle motor and the actuator and the like. This geometrical time delay Td is stored in the memory 109b beforehand. Here, the measured time delay Td is added to the geometrical time delay amount as an offset amount. The total time delay amount thus obtained is shown by a curve b in FIG. 18. Usually, the time delay Td equivalent to the offset amount is stored in the memory 109b after measuring and after both are added together by the recording timing correcting unit 109a, this calculating result is used as a total recording timing delay amount.

Therefore, the head 102 of the HDD itself can be used as the head for a reference signal, making it unnecessary to use the fixed head for a reference signal and possible to highly accurately align phases between adjacent tracks. In the description of the embodiment, reference was made to phase alignment in the index unit for the virtual servo information. However, this is applicable to phase alignment in a track direction of ID information of such as address codes and the like in the servo information.

As is clear from the foregoing, it is possible to solve the problems inherent in the method using the servo writer, etc., exclusively used for writing the servo information by realizing the self-servo writing method. That is, during writing of the servo information, vibration sources in the servo writer and the like are eliminated, an exciting force generated between the servo writer and the device is eliminated, and an influence from the spindle motor rotational vibration component is maintained to be little. It is, therefore, unnecessary to specially secure an environment for writing the servo information. Moreover, since provision of notched windows to the device main body is unnecessary because the servo writing method is employed, it is possible to prevent incursion of dust, etc. As a result, it is possible to efficiently record high density and high quality servo information in the disk.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk drive comprising:
    a disk in which preservo information is written;
    a head for writing a signal in the disk and reading a signal from the disk;
    positioning means for positioning the head at a desired position of the disk in accordance with servo information; and
    writing means for writing virtual servo information in the disk in accordance with the preservo information and for writing the servo information in a predetermined area on the disk based on the virtual servo information, wherein the writing means writes the virtual servo information and the servo information according to a sampling frequency which is higher than a servo data sampling frequency during a normal processing of the disk drive.

2. A disk drive according to claim 1, further comprising:
    means for controlling the writing means so as to perform writing of the virtual servo information and the servo information by the writing means on a full surface of the disk.

3. A disk drive according to claim 1, wherein the writing means reads and analyzes the preservo information via the head and writes the virtual servo information in accordance with a result of the analysis.

4. A disk drive according to claim 3, wherein the writing means determines an amount of motion of the head by analyzing the preservo information and writes the virtual servo information in accordance with the head moving amount.

5. A disk drive according to claim 4, wherein the writing means writes the virtual servo information in the disk by transfer-positioning the head in accordance with the amount of motion of the head and writes the servo information in the predetermined area by transfer-positioning the head in accordance with the written virtual servo information.

6. A disk drive according to claim 3, further comprising:
a spindle motor for rotary-driving the disk, and
wherein the writing means determines a time delay in accordance with the head, the spindle motor and the positioning means and writes the virtual servo information and the servo information in the disk in accordance with the determined time delay.

7. A disk drive according to claim 1, wherein the writing means writes the virtual servo information in an area different from an area in which the preservo information is written, and the servo information is overwritten on the virtual servo information.

8. A disk drive according to claim 1, wherein the writing means intermittently writes the virtual servo information in each of sectors of the disk.

9. A disk drive according to claim 1, further comprising:
a spindle motor for rotary-driving the disk,
wherein the preservo information is written in the disk being provided with a vibration component smaller than a sum of square of a rotation asynchronous vibration component of the spindle motor and square of a vibration component produced during writing of the servo information.

10. A disk drive according to claim 1, further comprising:
a casing for tightly enclosing the disk, the head, the positioning means and the writing means.

11. A disk drive according to claim 1, wherein the preservo information is written in at least two tracks on the disk.

12. A servo writing method of a disk drive having a disk in which preservo information is written, a head for writing a signal in the disk and for reading a signal from the disk and positioning means for positioning the head on a desired position of the disk in accordance with servo information, said method comprising the steps of:
writing virtual servo information in the disk in accordance with the preservo information; and
writing the servo information in a predetermined area of the disk in accordance with the virtual servo information;
wherein the virtual servo information writing step and the servo information writing step are executed according to a sampling frequency which is higher than a servo data sampling frequency during a normal processing of the disk drive.

13. A servo writing method according to claim 12, further comprising the step of:
controlling the virtual servo information writing step to allow the virtual servo information to be written on a full surface of the disk; and
controlling the servo information writing step to allow the servo information to be written on a full surface of the disk.

14. A servo writing method according to claim 12, wherein the virtual servo information writing step includes a step of reading and analyzing the preservo information via the head and a step of writing the virtual servo information in the disk in accordance with a result of the analysis.

15. A servo writing method according to claim 14, wherein the virtual servo information writing step includes a step of determining a moving amount of the head by analyzing the preservo information and a step of writing the virtual servo information on the disk in accordance with the determined head moving amount.

16. A servo writing method according to claim 15, wherein the virtual servo information writing step includes a step of transferring and positioning the head in accordance with the head moving amount so as to write the virtual servo information in the disk, and the servo information writing step includes a step of transferring and positioning the head in accordance with the virtual servo information so as to write the servo information in the predetermined area of the disk.

17. A servo writing method according to claim 14, wherein the disk drive has a spindle motor for rotary-driving the disk, the virtual servo information writing step includes a step of determining a time delay in accordance with the head, the spindle motor and the positioning means and a step of writing the virtual servo information on the disk in accordance with the determined time delay, and the servo information writing step includes a step of writing the servo information in the disk in accordance with the determined time delay.

18. A servo writing method according to claim 12, wherein the virtual servo information writing step includes a step of writing the virtual servo information in an area different from an area in which the preservo information is written, and the servo information writing step includes a step of overwriting the servo information on the virtual servo information.

19. A servo writing method according to claim 12, wherein the virtual servo information writing step includes a step of intermittently writing virtual servo information in each of sectors of the disk.

20. A servo writing method according to claim 12, wherein the disk drive has a spindle motor for rotary-driving the disk, and the preservo information is written in the disk being provided with a vibration component smaller than a sum of square a rotation asynchronous vibration component of the spindle motor and square a vibration component produced during writing of the servo information.

21. A servo writing method according to claim 12, wherein the preservo information is written in at least two tracks on the disk.

22. A disk drive comprising:
a disk in which preservo information is written;
a head for writing a signal in the disk and reading a signal from the disk;
positioning means for positioning the head at a predetermined position of the disk in accordance with servo information;
writing means for writing, in a servo writing mode, virtual servo information on the disk in accordance with the preservo information and the servo information in a predetermined area of the disk in accordance with the virtual servo information and for performing one of steps of reading and writing, in a normal mode, data in a desired area of the disk by controlling the positioning means; and
means for supplying a sampling frequency to the writing means;
wherein a sampling frequency supplied in the servo writing mode is higher than a servo data sampling frequency supplied in the normal mode.

23. A disk for use in a disk drive having a spindle motor for rotating the recording medium and a self-servo writing function, the disk comprising:

servo information provided with a vibration component smaller than a sum of squares of a rotation asynchronous vibration component of the spindle motor and squares of a vibration component produced during data writing; and virtual servo information provided for following the servo information and provided with the vibration component, the servo information and the virtual servo information being used to execute the self-servo writing function according to a predetermined frequency which is higher than a servo data sampling frequency during a normal processing of the disk drive.

24. A disk according to claim 23, wherein the servo information and the virtual servo information are provided on the outer periphery of the disk.

25. A disk according to claim 23, wherein the servo information and the virtual servo information are provided on at least two tracks of the disk.

* * * * *